(12) United States Patent
Shimizu et al.

(10) Patent No.: US 10,554,535 B2
(45) Date of Patent: Feb. 4, 2020

(54) APPARATUS AND METHOD TO PERFORM ALL-TO-ALL COMMUNICATION WITHOUT PATH CONFLICT IN A NETWORK INCLUDING PLURAL TOPOLOGICAL STRUCTURES

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 15/608,341

(22) Filed: May 30, 2017

(65) Prior Publication Data

US 2017/0353377 A1    Dec. 7, 2017

(30) Foreign Application Priority Data

Jun. 6, 2016   (JP) .................................. 2016-113071

(51) Int. Cl.
  *H04L 12/751* (2013.01)
  *H04L 12/24* (2006.01)
  (Continued)

(52) U.S. Cl.
  CPC .............. *H04L 45/02* (2013.01); *H04L 41/12* (2013.01); *H04L 45/026* (2013.01);
  (Continued)

(58) Field of Classification Search
  None
  See application file for complete search history.

(56) References Cited

U.S. PATENT DOCUMENTS

| | | | | |
|---|---|---|---|---|
| 5,103,444 A | * | 4/1992 | Leung | ................. H04L 12/1813 370/432 |
| 5,140,585 A | * | 8/1992 | Tomikawa | .............. H04L 12/00 370/354 |

(Continued)

FOREIGN PATENT DOCUMENTS

| | | |
|---|---|---|
| JP | 2009-20797 | 1/2009 |
| JP | 2014-164756 | 9/2014 |

OTHER PUBLICATIONS

Nienaber, W. (2014). Effective Routing on Fat-Tree Topologies. Retrieved from http://purl.flvc.org/fsu/fd/FSU_migr_etd-8860.*

(Continued)

*Primary Examiner* — Ayaz R Sheikh
*Assistant Examiner* — Tarell A Hampton
(74) *Attorney, Agent, or Firm* — Staas & Halsey LLP

(57) ABSTRACT

An apparatus stores connection information indicating connection relationship among topological structures in a network, in which first-type topological structures are coupled to second-type topological structures. The apparatus stores first transfer-patterns each indicating a combination of input and output ports for performing all-to-all communication without path conflict in each of the first-type topological structures, and second transfer-patterns each indicating a combination of input and output ports for performing all-to-all communication without path conflict in each of the second-type topological structures. The apparatus identifies paths from transmission sources to transmission destinations for a combination of the first and second transfer-patterns, and determines, based on the identified paths, a transfer-pattern with which to perform all-to-all communication without path conflict from the transmission sources to the transmission destinations, and determines output ports in (Continued)

each of the first- and second-type topological structures, corresponding to the identified paths.

9 Claims, 13 Drawing Sheets

(51) Int. Cl.
  *H04L 12/725* (2013.01)
  *G06F 15/173* (2006.01)
  *H04B 10/27* (2013.01)
  *H04B 10/40* (2013.01)

(52) U.S. Cl.
  CPC .... *H04L 45/3065* (2013.01); *G06F 15/17306* (2013.01); *H04B 10/271* (2013.01); *H04B 10/40* (2013.01)

(56) References Cited

U.S. PATENT DOCUMENTS

| | | | | |
|---|---|---|---|---|
| 5,453,978 | A * | 9/1995 | Sethu | H04L 45/00 370/254 |
| 5,621,908 | A * | 4/1997 | Akaboshi | G06F 7/24 |
| 6,091,725 | A * | 7/2000 | Cheriton | H04L 12/4645 370/392 |
| 6,456,838 | B1 * | 9/2002 | Wang | H04Q 3/68 370/380 |
| 7,236,488 | B1 * | 6/2007 | Kavipurapu | H04L 45/00 370/388 |
| 8,423,663 | B2 * | 4/2013 | Archer | H04L 45/02 709/238 |
| 8,737,269 | B1 * | 5/2014 | Zhou | H04L 12/462 370/255 |
| 2002/0141427 | A1 * | 10/2002 | McAlpine | H04L 47/39 370/413 |
| 2003/0072485 | A1 * | 4/2003 | Guerin | H04L 41/12 382/166 |
| 2003/0218989 | A1 * | 11/2003 | El-Amawy | H04L 45/06 370/255 |
| 2005/0177507 | A1 * | 8/2005 | Bandych | G06Q 20/10 705/40 |
| 2008/0084889 | A1 * | 4/2008 | Archer | H04L 45/00 370/400 |
| 2008/0164907 | A1 * | 7/2008 | Mercaldi-Kim | H03K 19/177 326/41 |
| 2009/0016332 | A1 | 1/2009 | Aoki et al. | |
| 2009/0043486 | A1 * | 2/2009 | Yang | G01C 21/3492 701/117 |
| 2010/0180048 | A1 * | 7/2010 | Guo | H04L 45/125 709/242 |
| 2011/0085557 | A1 * | 4/2011 | Gnanasekaran | H04L 45/583 370/401 |
| 2011/0125824 | A1 * | 5/2011 | Naruse | G06F 9/542 709/201 |
| 2011/0235647 | A1 * | 9/2011 | Baba | H04L 12/4625 370/401 |
| 2011/0273987 | A1 * | 11/2011 | Schlansker | H04L 12/462 370/235 |
| 2012/0016997 | A1 * | 1/2012 | Naruse | G06F 9/54 709/227 |
| 2012/0106556 | A1 * | 5/2012 | Naruse | H04L 49/356 370/400 |
| 2013/0021922 | A1 * | 1/2013 | Nakashima | H04L 61/2038 370/244 |
| 2013/0083701 | A1 * | 4/2013 | Tomic | H04L 12/462 370/255 |
| 2013/0108259 | A1 * | 5/2013 | Srinivas | H04Q 3/0083 398/25 |
| 2013/0114620 | A1 * | 5/2013 | Bogdanski | H04L 45/48 370/408 |
| 2013/0308444 | A1 * | 11/2013 | Sem-Jacobsen | H04L 47/125 370/230 |
| 2014/0211631 | A1 * | 7/2014 | Haramaty | H04L 47/122 370/237 |
| 2014/0245324 | A1 | 8/2014 | Minkenberg et al. | |
| 2015/0043905 | A1 * | 2/2015 | Graves | H04Q 11/0005 398/25 |
| 2015/0092599 | A1 * | 4/2015 | Nakashima | H04L 41/12 370/254 |
| 2015/0098466 | A1 * | 4/2015 | Haramaty | H04L 61/103 370/390 |
| 2018/0113739 | A1 * | 4/2018 | Shimizu | G06F 9/4881 |

OTHER PUBLICATIONS

M.Valerio, et al., "Using Fat-Trees to Maximize the Number of Processors in a Massively Parallel Computer", IEEE Computer Society, 1993, 7 pages.

* cited by examiner

APPARATUS AND METHOD TO PERFORM ALL-TO-ALL COMMUNICATION WITHOUT PATH CONFLICT IN A NETWORK INCLUDING PLURAL TOPOLOGICAL STRUCTURES

CROSS-REFERENCE TO RELATED APPLICATION

This application is based upon and claims the benefit of priority of the prior Japanese Patent Application No. 2016-113071, filed on Jun. 6, 2016, the entire contents of which are incorporated herein by reference.

FIELD

The embodiments discussed herein are related to apparatus and method to perform all-to-all communication without path conflict in a network including plural topological structures.

BACKGROUND

In related art, a topological structure represents how devices, such as a server and a switch, in a network are coupled to one another. In the case where it is possible for each of multiple transmission sources to communicate with any of multiple destinations via a topological structure, the topological structure may be called a topological structure allowing communication from all to all (All-to-All communication). Furthermore, there is a topological structure that allows all-to-all communication without path conflict.

In related art, for instance, there is a technique including a first network coupled to multiple nodes and switches, and a second network partially coupled to the multiple nodes. Also, a program task has hierarchical level $I_n$, and may be connected by an interconnection network using a hierarchical network topology where N>1, n=1 to N.

Related techniques are disclosed in, for example, Japanese Laid-open Patent Publication Nos. 2009-020797 and 2014-164756.

SUMMARY

According to an aspect of the invention, an apparatus store connection information indicating connection relationship between topological structures in a network, in which each of a second number of first-type topological structures is coupled to each of a first number of second-type topological structures, where each of the second number of first-type topological structures includes the first number of output ports and the first number of input ports to which a plurality of transmission sources are coupled, respectively, and each of the first number of second-type topological structures includes the second number of input ports and the second number of output ports to which a plurality of destinations are coupled, respectively. The apparatus further stores the first number of transfer patterns each indicating a combination of input ports and output ports for performing all-to-all communication without path conflict in each of the second number of first-type topological structures, and the second number of transfer patterns each indicating a combination of input ports and output ports for performing all-to-all communication without path conflict in each of the first number of second-type topological structures. The apparatus identifies a plurality of paths from the plurality of transmission sources to the plurality of transmission destinations in the network indicated by the connection information, in association with a combination of a first transfer pattern among the first number of transfer patterns and a second transfer pattern among the second number of transfer patterns. The apparatus, based on the identified plurality of paths, determines a third transfer pattern with which to perform all-to-all communication without path conflict from the plurality of transmission sources to the plurality of transmission destinations in the network, and determines output ports of each of the second number of first-type topological structures and of each of the first number of second-type topological structures in the network, corresponding to the identified plurality of paths in the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a network is formed by combining multiple topological structures in related art, it is difficult to perform all-to-all communication without path conflict in the network. For instance, an approach may be taken that regards one the topological structure as an equivalent of one switch, thereby reducing the number of components in a network and facilitating study of a communication procedure to perform all-to-all communication without path conflict. However, when one switch is compared with one topological structure having the same number of ports as that of the switch, depending on a combination of input ports and output ports, path conflict may occur in the topological structure, whereas all-to-all communication is possible without conflict in the switch. Therefore, in order to study a communication system that performs all-to-all communication without path conflict, one topological structure may not be regarded as an equivalent of one switch.

It is preferable to perform all-to-all communication without path conflict in a network formed by combining multiple topological structures.

Hereinafter, an embodiment of an information processing apparatus, a communication procedure determination method, and a communication program in the disclosure will be described in detail with reference to the drawings.

Figure 1:
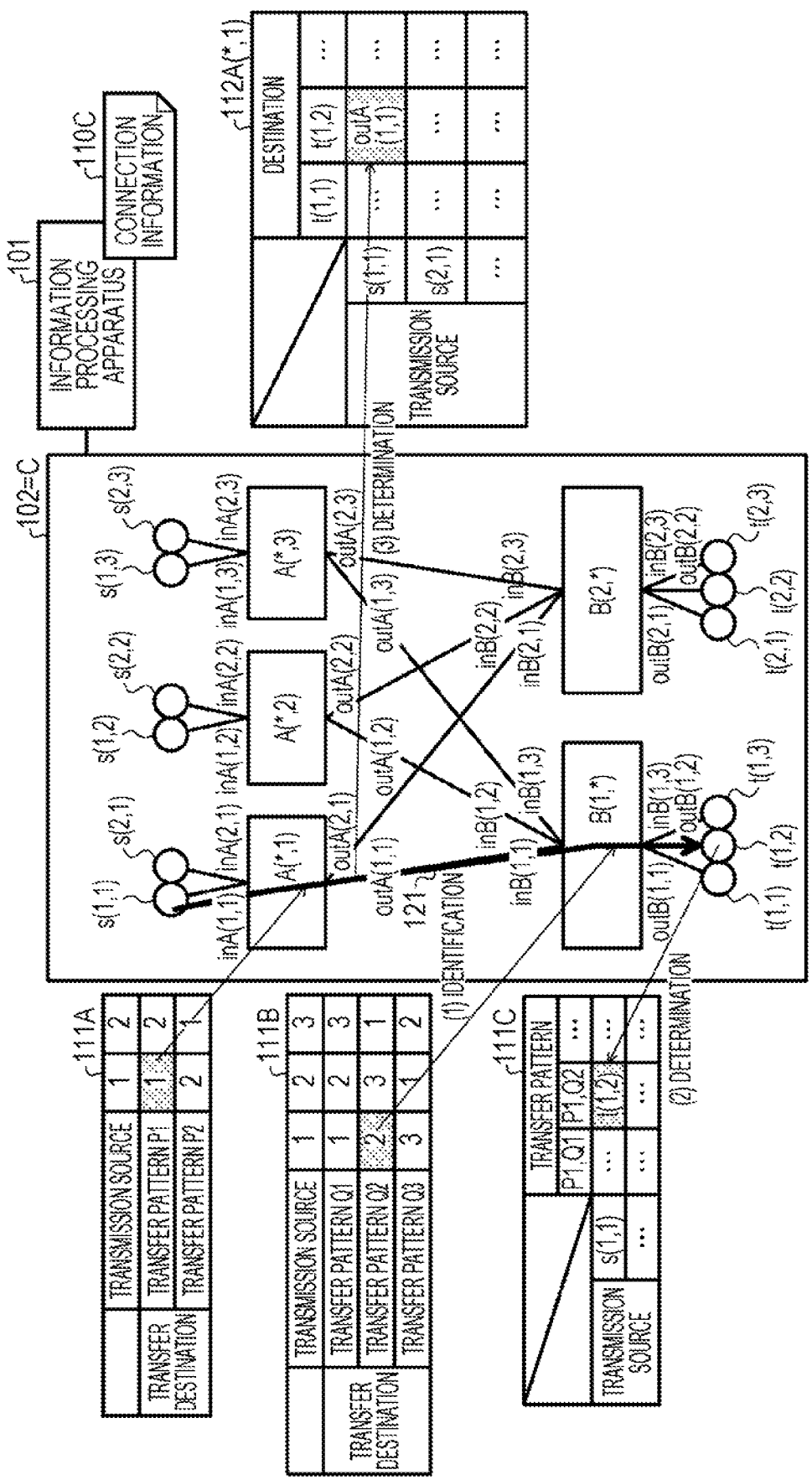
FIG. 1 is a diagram illustrating an example of an operation of an information processing apparatus, according to an embodiment.

FIG. 1 is an explanatory diagram illustrating an operation example of an information processing apparatus 101 according to this embodiment. The information processing apparatus 101 is a computer that determines a communication procedure that allows communication from all to all to be performed without path conflict in a network formed by combining multiple topological structures. For instance, the information processing apparatus 101 is a management server that manages a network.

A topological structure represents how devices, such as a server and a switch, are coupled. In the case where it is possible for each of multiple transmission sources to communicate with any of multiple destinations via a topological structure, the topological structure may be called a topological structure allowing communication from all to all. Hereinafter, the communication from all to all is also referred to as "All-to-All communication". Furthermore, there is a topological structure that allows All-to-All communication to be performed without path conflict. For instance, Fat-Tree, multi-layer full-mesh, and Latin square Fat-Tree are topological structures that allow All-to-All communication to be performed without path conflict. An example of Latin square Fat-Tree will be described using FIG. 2. Latin square Fat-Tree is described in the following non patent literature (NPL) 1.

(NPL 1: M. Valerio et al. "Using Fat-Trees to Maximize the Number of Processors in a Massively Parallel Computer", IEEE Computer Society, 1993)

Also, in two-layer Fat-Tree and Latin square Fat-Tree, All-to-All communication from an input server to an output server is possible without path conflict. In short, one-way All-to-All communication without path conflict is possible. Although All-to-All communication from an output server to an input server is possible by following a reverse path, All-to-All communication between input servers or between output servers may not be possible. In addition, it is assumed that in the topological structure according to this embodiment, the number of input ports and the number of output ports are equal to each other.

For instance, when parallel distributed processing of fast Fourier transform (FFT) is performed in high performance computing (HPC), in order to exchange data more efficiently at a low cost, the topological structure allowing All-to-All communication to be performed without path conflict is utilized.

Here, when it is desired to couple more servers without increasing the number of switch ports while maintaining All-to-All communication without path conflict, an approach may be taken that forms a network by combining multiple topological structures. However, when a network is formed by combining multiple topological structures, it is difficult to perform All-to-All communication without path conflict in the network. For instance, an approach may be taken that regards one topological structure as an equivalent of one switch, thereby reducing the number of components in a network and facilitating study of a communication procedure to perform All-to-All communication without path conflict. However, when one switch is compared with one topological structure having the same number of ports as that of the switch, depending on a combination of an input port and an output port, path conflict may occur in the topological structure, whereas All-to-All communication is possible without conflict in the switch. Therefore, in order to study a communication system that performs All-to-All communication without path conflict, one topological structure may not be regarded as an equivalent of one switch.

An example will be described, in which depending on a combination of an input port and an output port, path conflict occurs in a topological structure, whereas All-to-All communication is possible without conflict in a switch. For instance, it is assumed that a topological structure has switches 1 to 4, each of which has four ports. It is assumed that the switch 1 is coupled to the switches 3, 4, and the switch 2 is coupled to the switches 3, 4. The switches 1 and 2 as well as the switches 3 and 4 are assumed to be not coupled. In this case, since each of the switches 1 to 4 has two free ports which are not coupled, the topological structure may be regarded as a virtual switch which has eight ports.

Here, in a switch having eight ports, path conflict never occurs for any combination of an input port and an output port. However, in the above-described topological structure, when communication is performed from one of two free ports of the switch 1 to one of two free ports of the switch 3 and simultaneously communication is performed from the other of the two free ports of the switch 1 to the other of the two free ports of the switch 3, path conflict occurs.

Thus, in this embodiment, a connection method in a new topological structure is provided by combining All-to-All communication without path conflict. In this embodiment, based on a path from each of multiple transmission sources to a destination, identified for each of combinations of transfer patterns of each topological structure in a new topological structure, a transfer pattern in a new topological structure and an output port of each the topological structure are determined. FIG. 1 illustrates determination of a transfer pattern in a new topological structure and an output port of each topological structure.

An operation example of the information processing apparatus 101 will be described using FIG. 1. A network 102 is a network that is formed by combining a first type of the topological structure A, and a second type of the topological structure B. Here, the network 102 may also be regarded as a topological structure. In the following description, the network 102 is described as "the topological structure C". Also, the information processing apparatus 101 may be a server in the topological structure C or an external server of the topological structure C. The topological structure C is a two-layer topological structure in which each of a second number of topological structures A and each of a first number of topological structures B are coupled. The first number and the second number may be the same number or different numbers. In addition, the topological structures A, B are topological structures that allow All-to-All communication to be performed without path conflict. The topological structures A, B may be the same type or different types.

Here, the topological structure A includes the first number of input ports and the first number of output ports. The topological structure C includes the second number topological structures A. Furthermore, an input server s is coupled to each of the input ports of the second number of topological structures A. Therefore, the number of the input servers s is equal to the product of the first number and the second number.

On the other hand, the topological structure B includes the second number of input ports and the second number of output ports. The topological structure C includes the first number of topological structures B. Furthermore, an output server t is coupled to each of the output ports of the first number of topological structures B. Therefore, the number of output servers t is equal to the product of the first number and the second number. Consequently, the number of the input server s and the number of the output server t are the same.

FIG. 1 illustrates an example of the case where the first number is 2 and the second number is 3. The topological structure C illustrated in FIG. 1 includes the topological structures A (*, 1), A (*, 2), A (*, 3), and the topological structures B (1, *), B (2, *). Hereinafter, a string in parentheses, out of symbols assigned to the topological structure and to attributes related to a topological structure, is referred to as symbols in parentheses. For instance, the symbols in parentheses of the topological structure A (*, 1) are "*, 1". Then output ports outA (1, 1) to outA (2, 3) of the topological structures A (*, 1) to A(*, 3) are coupled to input ports inB(1, 1) to inB(2, 3) of the topological structures B (1, *) and B(2, *), respectively. Specifically, each of outA(1, 1) to outA(2, 3) is coupled to an inB that has the same symbols in parentheses.

Also, input ports inA(1, 1) to inA(2, 3) of the topological structures A (*, 1) to A(*, 3) are respectively coupled to the input servers s(1, 1) to s(2, 3) as multiple transmission sources. Similarly, output ports inB(1, 1) to inB (2, 3) of the topological structures B (1, *) and B(2, *) are respectively coupled to the output servers t(1, 1) to t(2, 3) as multiple destinations.

The information processing apparatus 101 stores connection information 110C indicating the connection relationship of each topological structure in the topological structure C, the transfer pattern table 111A of the topological structure A, and the transfer pattern table 111B of the topological structure B. Specifically, as the connection relationship of each topological structure, the connection information 110C indicates that output port outA of the topological structure A is coupled to which input port inB of which topological structure B, and the input server s or the output server t is coupled to which port. Also, the connection information 110C may be generated by an administrator of the topological structure C or generated by the information processing apparatus 101 as described later. Alternatively, the connection information 110C may be generated by a server in the topological structure C executing a command for searching for a structure in the topological structure C.

In addition, the transfer pattern table 111A includes the first number of transfer patterns that represent combinations of an input port and an output port with which to perform All-to-All communication without path conflict in the topological structure A. Similarly, the transfer pattern table 111B includes the second number of transfer patterns that represent combinations of an input port and an output port with which to perform All-to-All communication without path conflict in the topological structure B. For instance, the transfer pattern table 111A has the first number of, that is, two transfer patterns P1, P2. For instance, the transfer pattern P1 is such that when the transmission source is input port 1, transfer is made to output port 1, and when the transmission source is input port 2, transfer is made to output port 2.

As a communication procedure for performing All-to-All communication without path conflict in the topological structure C, the information processing apparatus 101 determines a transfer pattern of the topological structure C, and an output port corresponding to a combination of a transmission source and a destination in each topological structure in the topological structure C. First, the information processing apparatus 101 generates a combination of each of the first number of transfer patterns of the transfer pattern table 111A, and each of the second number of transfer patterns of the transfer pattern table 111B. In the case of FIG. 1, the information processing apparatus 101 generates 6 (=2×3) combinations: (P1, Q1), (P1, Q2), . . . , (P2, Q3).

In a case where a transfer pattern is designated, in the topological structure C, in association with each of the generated combinations, the information processing apparatus 101 identifies a path from each of multiple transmission sources to a destination. FIG. 1 illustrates an example in which a path corresponding to (P1, Q2) as a combination is identified.

Here, when a combination is designated by the input server s, all of the topological structures A apply the same transfer pattern, and all of the topological structures B apply the same transfer pattern. For instance, for (P1, Q2), the topological structures A(*, 1) to A(*, 3) apply the transfer pattern P1, and the topological structures B(1, *), B(2, *) apply the transfer pattern P2.

A method of identifying a path will be described. For each of multiple transmission sources, the information processing apparatus 101 identifies a path when the transfer patterns P1, P2 are applied. FIG. 1 illustrates an example in which when a transmission source is the input server s(1, 1), path 121 is identified as indicated by (1). First, the information processing apparatus 101 refers to the connection information 110C, and confirms that the input server s(1, 1) is coupled to input port inA(1, 1).

When referring to the transfer pattern table 111, the information processing apparatus 101 focuses attention on the component at the position of "*" out of symbols in parentheses assigned to a topological structure. For instance, in the case of the topological structure A(*, 1), the information processing apparatus 101 focuses attention on the first component of inA, outA because "*" is positioned at the first component. Specifically, the information processing apparatus 101 focuses attention on the first component "1" of inA(1, 1), the first component "2" of inA(2, 1), the first component "1" of outA(1, 1), and the first component "2" of outA(2, 1). Therefore, the information processing apparatus 101 identifies that transmission from inA (1, 1) corresponds to the transmission source "1" in the transfer pattern table 111A, and identifies a transfer destination "1" in the transfer pattern P1. The information processing apparatus 101 then identifies that transmission from inA (1, 1) is transferred to outA (1, 1) which corresponds to transfer destination "1".

Next, the information processing apparatus 101 refers to the connection information 110C and identifies that an input port connected to outA(1, 1) is inB (1, 1) of the topological structure B(1, *). The information processing apparatus 101 then refers to the transfer pattern table 111B, and identifies that transmission from inB(1, 1) of the topological structure B(1, *) is transferred to outB(1, 2). Here, using the same technique in the description given to the topological structure A(*, 1), the information processing apparatus 101, when referring to the transfer pattern table 111B, focuses attention on the second components of inB, outB. The information processing apparatus 101 then identifies that transmission from the input server s(1, 1) is finally transferred to the output server t(1, 2) coupled to outB(1, 2). Consequently, the information processing apparatus 101 identifies path 121 from the input server s(1, 1) to the output server t(1, 2) through outA(1, 1) and outB(1, 2). For other input servers, and other transfer patterns, the information processing apparatus 101 identifies a path by using the same technique.

Based on a path identified in association with a combination of transfer patterns, the information processing apparatus 101 then determines transfer patterns in the topological structure C, and an output port corresponding to a combination of a transmission source and a destination in each topological structure in the topological structure C. The transfer patterns in the topological structure C allow All-to-All communication to be performed from each of multiple transmission sources to each of multiple destinations without path conflict. FIG. 1 illustrates the transfer patterns in the topological structure C as a transfer pattern table 111C. In the transfer pattern table 111C, a destination corresponding to a combination of a transmission source and a transfer pattern is registered.

FIG. 1 illustrates output ports as an the output port table 112A(*, 1), each of the output ports corresponding to a combination of a transmission source and a destination in the topological structure A(*, 1). As other topological structures, for the topological structures A(*, 2), A(*, 3), B(1, *), B(2, *), the information processing apparatus 101 also generates a corresponding output port table 112, which is, however, omitted in FIG. 1 for the sake of simplification of description.

For instance, as indicated by (2) of FIG. 1, the information processing apparatus 101 determines s(1, 1) and t(1, 2) as a combination of a transmission source and a destination in (P1, Q2) pattern, based on path 121. The combination of s(1, 1) and t(1, 2) is an element of the transfer pattern table 111C. Thus, the information processing apparatus 101 registers "t(1, 2)" in a corresponding cell of the transfer pattern table 111C.

Also, the information processing apparatus 101 identifies that the output ports of the topological structures on path 121 are outA(1, 1) and outB(1, 2) based on path 121. Thus, the information processing apparatus 101 determines that the output port corresponding to the combination of s(1, 1) and t(1, 2) in the topological structure A(*, 1) is outA(1,1) as indicated by (2) of FIG. 1. Thus, the information processing apparatus 101 registers "outA(1, 1)" in a corresponding field of the output port table 112A.

When registration in the transfer pattern table 111 and the output port table 112 are finished for all the identified paths, the information processing apparatus 101 completes generation of the transfer pattern table 111 and the output port table 112.

Consequently, the input server s performs communication in accordance with the transfer pattern table 111, and each topological structure in the topological structure C operates in accordance with the output port table 112, and the topological structure C thereby allows All-to-All communication to be performed without path conflict.

Although a state after the topological structure C is constructed has been described in FIG. 1, the information processing apparatus 101 may generate the connection information 110C. An administrator of the topological structure C reviews the generated connection information 110C and may construct the topological structure C. Specifically, based on the generated connection information 110C, the administrator of the topological structure C sees that the output port of the topological structure A is to be coupled to which input port of the topological structure B. An example of generation of the connection information 110C will be described in FIGS. 7, 10, and 13. It is to be noted that an apparatus described in FIG. 1 that determines a communication procedure for performing All-to-All communication without path conflict, and an apparatus that generates the connection information 110C may be different. In this case, the apparatus that generates the connection information 110C may be a personal computer (PC), for instance. Next, an example of Latin square Fat-Tree will be described using FIG. 2.

Figure 2:
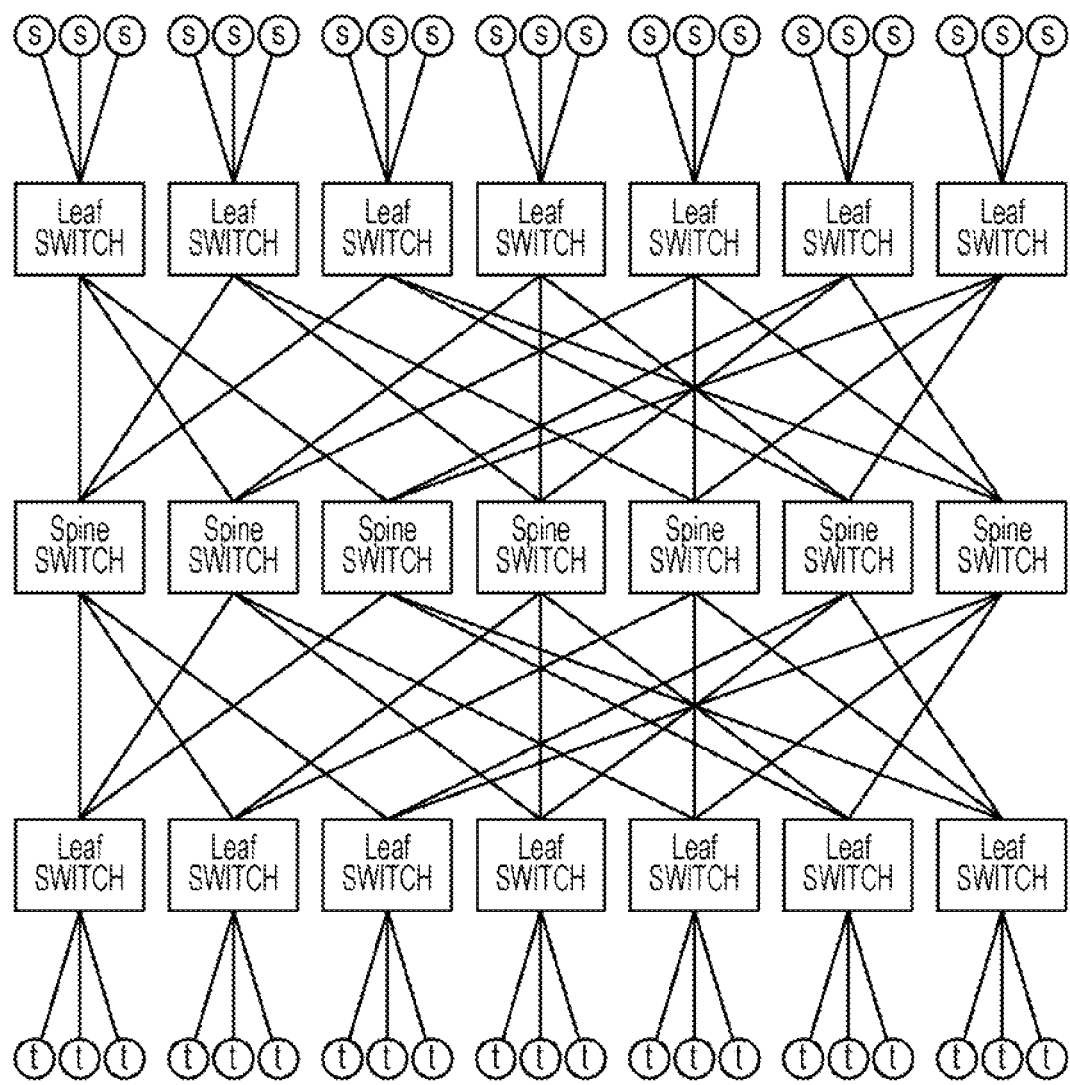
FIG. 2 is a diagram illustrating an example of a Latin square Fat-Tree, according to an embodiment.

FIG. 2 is an explanatory diagram illustrating an example of a Latin square Fat-Tree. As an example of a topological structure that allows All-to-All communication to be performed without conflict, FIG. 2 illustrates an example of connection in a Latin square Fat-Tree. In FIG. 2, each circle indicates a server, and each square indicates a switch. Each server assigned with "s" inside a circle indicates an input server. Also, each server assigned with "t" inside a circle indicates an output server. There are two types of switch: a Leaf switch that connects other switches and a server, and a Spine switch that connects switches. The input server s and the output server t perform communication through the Leaf switch and the Spine switch. The "number of hops" is defined as the number of switches through which communication is performed.

In the Latin square Fat-Tree illustrated in FIG. 2, communication is possible between the input server s and the output server t with three hops, and more servers are connectable than in two-layer Fat-Tree.

It is to be noted that each of Leaf switches of the Latin square Fat-Tree illustrated in FIG. 2 is coupled to three Spine switches out of seven Spine switches. When each Leaf switch is coupled to all Spine switches, the topological structure is a Fat-Tree.

Figure 3:
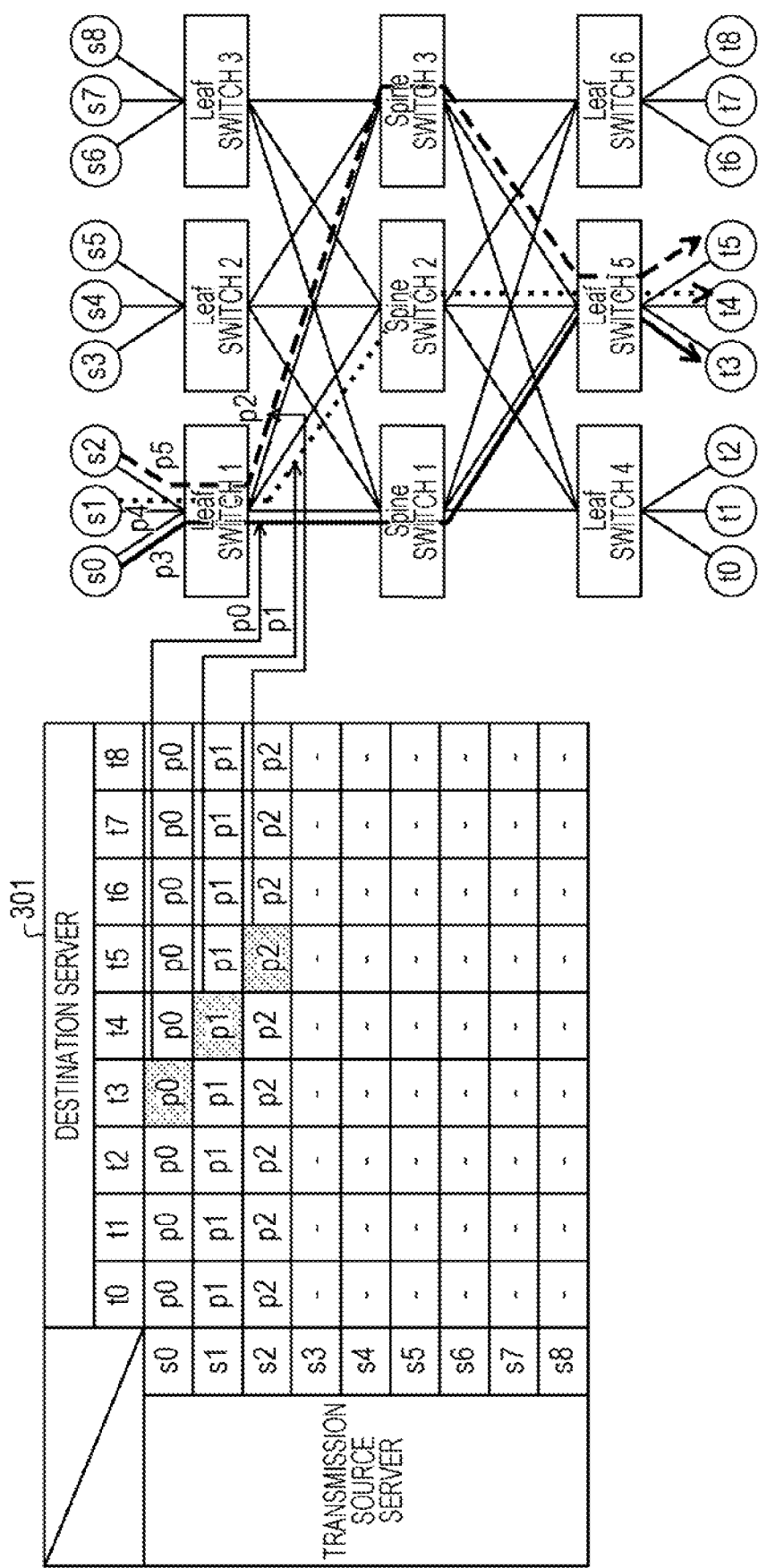
FIG. 3 is a diagram illustrating an example of memory contents of a switch for performing All-to-All communication, according to an embodiment.

FIG. 3 is an explanatory diagram illustrating an example of memory contents of a switch for performing All-to-All communication. FIG. 3 illustrates an example in which the input servers s0 to s8 and the output servers t0 to t8 are coupled through three of Leaf switches 1 to 6 and Spine switches 1 to 3. FIG. 3 illustrates an example of memory contents held by Leaf switch 1.

Each switch stores information that identifies an output port corresponding to a combination of a transmission source server and a destination server. Leaf switch 1 has ports p0 to p5. The example of FIG. 3 illustrates an output port table 301 as information held by Leaf switch 1. The output port table 301 is set in order to perform All-to-All communication without conflict. The vertical field of the output port table 301 indicates the transmission source servers, and the horizontal field indicates the destination servers. Also, each field, indicated by "-", in the output port table 301 may be set at any port number because the communication between source and destination servers corresponding the each field is not performed via the relevant switch.

FIG. 3 illustrates an example in which the input server s0 communicates with the output server t3, the input server s1 communicates with the output server t4, and the input server s2 communicates with the output server t5. Leaf switch 1, when receiving communication from the input server s0 to the output server t3, refers to the output port table 301, and identifies port p0 because the transmission source server is the input server s0 and the destination server is the output server t3. Leaf switch 1 then relays the communication from the input server s0 by using the identified port p0.

Also, when receiving communication from the input server s1 to the output server t4, Leaf switch 1 refers to the output port table 301, and identifies port p1 because the transmission source server is the input server s1 and the destination server is the output server t4. Also, when receiving communication from the input server s2 to the output server t5, Leaf switch 1 refers to the output port table 301, and identifies port p2 because the transmission source server is the input server s2 and the destination server is the output server t5. In a manner similar to Leaf switch 1, each of Spine switches 1 to 3 coupled to each of ports p0 to p2 of any Leaf switch also refers to the output port table owned by itself, and identifies an output port corresponding to a combination of a transmission source server and a destination server.

Consequently, the communication path from the input server s0 to the output server t3 is the thick solid line illustrated in FIG. 3. Similarly, the communication path from the input server s1 to the output server t4 is the thick dotted line illustrated in FIG. 3, and the communication path from the input server s2 to the output server t5 is the thick dashed line illustrated in FIG. 3. Like this, as illustrated in FIG. 3, no conflict occurs in the communication paths.

(Example Hardware Configuration of the Information Processing Apparatus 101)

Figure 4:
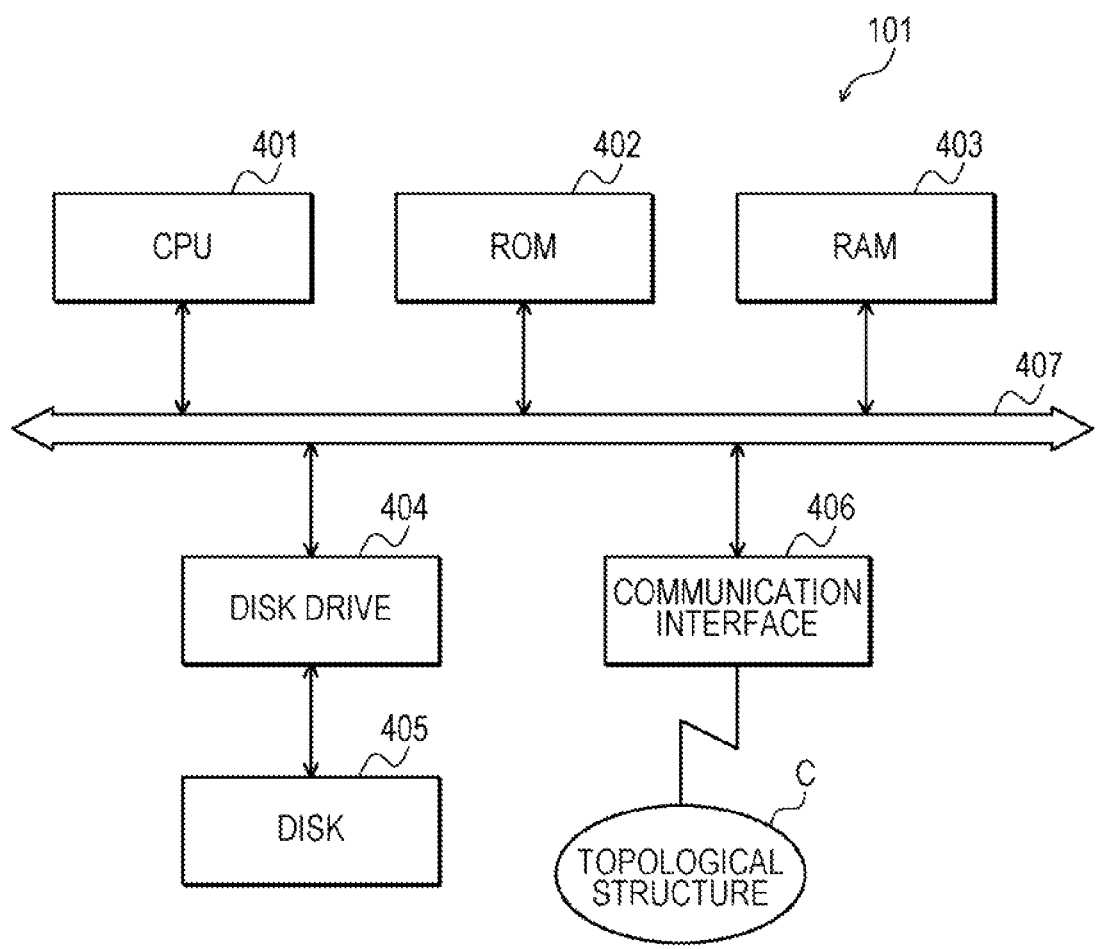
FIG. 4 is a diagram illustrating an example of a hardware configuration of an information processing apparatus, according to an embodiment.

FIG. 4 is an explanatory diagram illustrating an example of a hardware configuration of the information processing apparatus 101. In FIG. 4, the information processing apparatus 101 includes a central processing unit (CPU) 401, a read-only memory (ROM) 402, and a random access memory (RAM) 403. In addition, the information processing apparatus 101 includes a disk drive 404, a disk 405, and a communication interface 406. The CPU 401, the ROM 402, the RAM 403, the disk drive 404, and the communication interface 406 are coupled to one another via a bus 407.

The CPU 401 is an arithmetic processing unit that manages the control of the entire the information processing apparatus 101. The ROM 402 is a non-volatile memory that stores programs such as a boot program. The RAM 403 is volatile memory that is used as a work area of the CPU 401.

The disk drive 404 is a control device that controls reading and writing of data from and to the disk 405 in accordance with the control of the CPU 401. For the disk drive 404, for instance, a magnetic disk drive, an optical disk drive, and a solid state drive may be used. The disk 405 is a non-volatile memory that stores data written by the control of the disk drive 404. For instance, when the disk drive 404 is a magnetic disk drive, a magnetic disk may be used as the disk 405. When the disk drive 404 is an optical disk drive, an optical disk may be used as the disk 405. When the disk drive 404 is a solid state drive, a semiconductor memory formed of semiconductor devices, so-called a semiconductor disk, may be used as the disk 405.

The communication interface 406 is a control device that manages the topological structure C and internal interfaces, and controls input/output of data from other devices. Specifically, the communication interface 406 is coupled to other devices via the topological structure C through a communication line. As the communication interface 406, for instance, a modem or a local area network (LAN) adapter or the like may be used.

When an administrator of the information processing apparatus 101 directly operates the information processing apparatus 101, the information processing apparatus 101 may include hardware, such as a display, a keyboard, and a mouse.

When the information processing apparatus 101 generates the connection information 110C, the information processing apparatus 101 includes a keyboard, a mouse, and a display to receive an operation from a user. Furthermore, the information processing apparatus 101 may include a printer to output the generated the connection information 110C.

(Example Functional Configuration of the Information Processing Apparatus 101)

Figure 5:
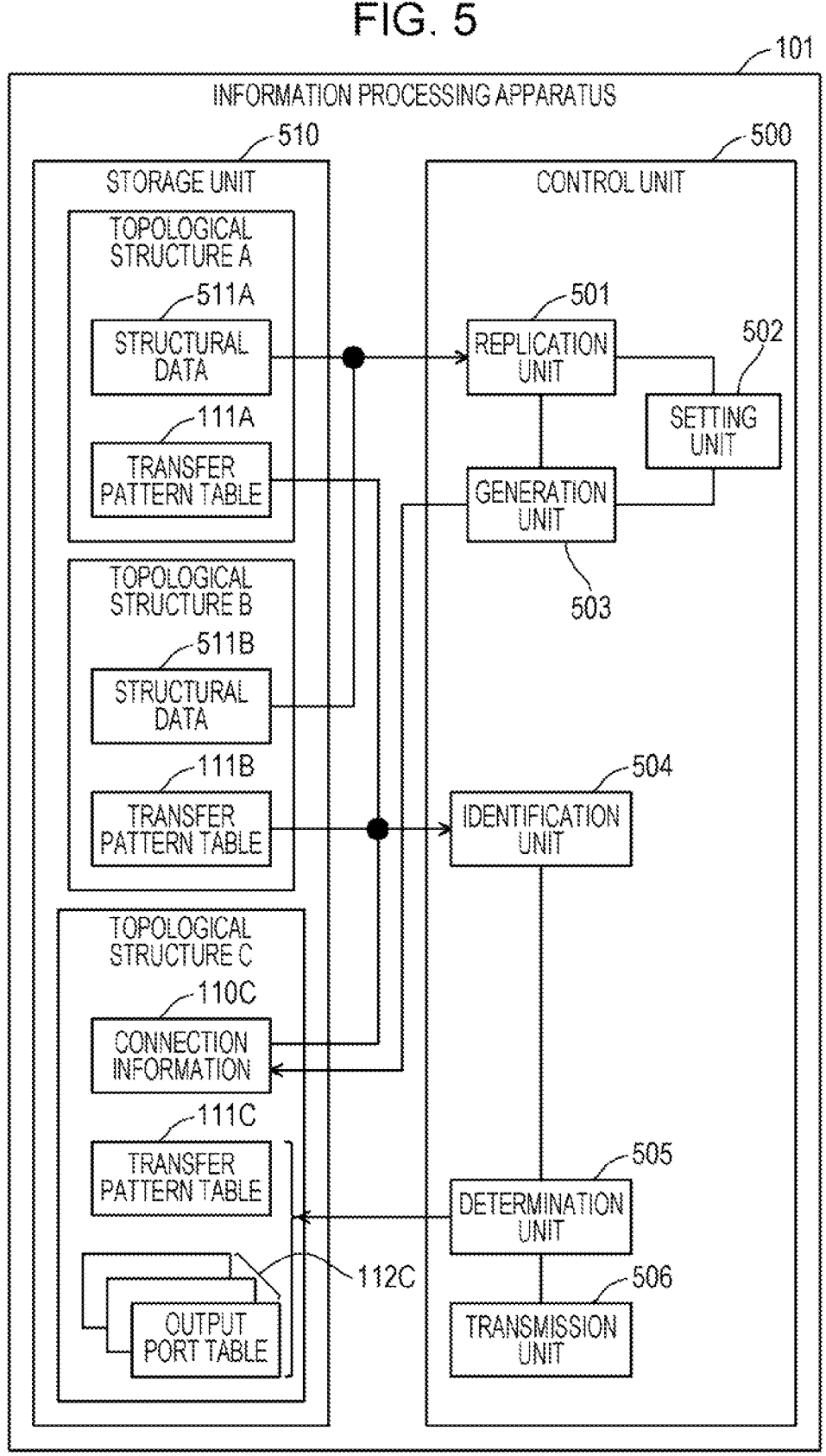
FIG. 5 is a diagram illustrating an example of a functional configuration of an information processing apparatus, according to an embodiment.

FIG. 5 is an explanatory diagram illustrating an example of a functional configuration of the information processing apparatus 101. The information processing apparatus 101 includes a control unit 500, and a memory unit 510. The control unit 500 includes a replication unit 501, a setting unit 502, a generation unit 503, an identification unit 504, a determination unit 505, and a transmission unit 506. The control unit 500 achieves the function of each component by the CPU 401 executing a program stored in a storage device. The storage device is, for instance, the ROM 402, the RAM 403, or the disk 405, illustrated in FIG. 4. A result of processing performed by each component is stored in the RAM 403, a register of the CPU 401, or a cache memory of the CPU 401.

With reference to FIG. 5, the generation of the connection information 110C on a new topological structure C and the determination of a communication procedure that allows All-to-All communication to be performed without path conflict in the topological structure C will be described.

Furthermore, in this embodiment, the topological structure C formed of a two-layer topological structure as Embodiment 1, and the topological structure C formed of an n-layer topological structure as Embodiment 2 will be described. In Embodiment 3, the topological structure C that allows two-way All-to-All communication to be performed without path conflict will be described. Embodiment 1 will be described in detail in FIGS. 7 to 9. Also, Embodiment 2 will be described in detail in FIG. 10. Also, Embodiment 3 will be described in detail in FIG. 13.

The information processing apparatus 101 is accessible to the memory unit 510. The memory unit 510 is stored in a storage device such as the RAM 403 or the disk 405. When the connection information 110C of the topological structure C formed of a two-layer topological structure is generated as Embodiment 1, it is sufficient that the memory unit 510 store structural data 511A indicating the topological structure A, and structural data 511B indicating the topological structure B. Here, it is sufficient that the structural data 511A, 511B include at least the number of input ports and output ports of the structural data 511A, 511B. Similarly, in Embodiment 2, 3, it is sufficient that the memory unit 510 store structural data 511A1 indicating the topological structure A1, structural data 511A2 indicating the topological structure A2, . . . , structural data 511An indicating the topological structure An, where n is an integer greater than or equal to 2.

First, the generation of the connection information 110C on the topological structure C will be described. In Embodiment 1, the replication unit 501, when receiving a request for generating the connection information 110C, replicates the second number of pieces of the structural data 511A, and replicates the first number of pieces of second the structural data 511B.

Here, the connection information 110C, in which the replicated structural data 511A and the replicated the structural data 511B are coupled, is generated, and a first method and a second method are provided as connection methods.

As the first method, the generation unit 503 generates the connection information 110C indicating connection relationship in which each of the first number of output ports of the replicated second number of pieces of the structural data 511A is coupled to one of the second number of input ports of the replicated first number of pieces of the structural data 511B.

As the second method, the setting unit 502 sets identification information (ID) of each of the first number of output ports of the replicated second number of pieces of the structural data 511A, at information that is obtained by combining a value that identifies each output port in the pieces of the structural data 511A and a value based on the second number, in this order. Furthermore, the setting unit 502 sets ID of each input port inB of the second number of input ports in each of the replicated first number of pieces of the structural data 511B, at information that is obtained by combining a value based on the second number and a value that identifies each input port in the pieces of second structural data.

For instance, the processing of the setting unit 502 will be described using FIG. 1. First, the replication unit 501 replicates the second number of, that is, three structural data A(*, 1), A(*, 2), and A(*, 3). For instance, the setting unit 502 sets ID of each output port of structural data A(*, 1) at information that is obtained by combining a value that identifies each output port in structural data A(*, 1), and one value of 1 to 3 based on the second number. The value that identifies each output port in structural data A(*, 1) is either 1 or 2. Also, one value of 1 to 3 based on the second number is the same value as the second component of structural data A(*, 1), that is, "1". As a result, the setting unit 502 sets ID of output ports outA of structural data A (*, 1) at outA(1, 1) and outA(1, 2), respectively.

The generation unit 503 then generates the connection information 110C indicating connection relationship in which an output port and an input port having the same ID are coupled. Specifically, the connection information 110C indicates that each output port of the first number of output ports of the second number of pieces of the structural data 511A is coupled to an input port of the second number of input ports of the first number of pieces of the structural data 5116, which has the same ID as the each output port.

Next, Embodiment 2 will be described. The replication unit 501 receives a request for generating the connection information 110C indicating the connection relationship between topological structures in the topological structure C having n types of topological structure, where n is a natural number greater than or equal to two. In this case, the replication unit 501 replicates a number $R_i$ of pieces of ith structural data indicating ith-type topological structure, where i is a natural number of 1 to n, and the number $R_i$ is obtained by dividing the product of the first number to the nth number by the ith number.

The setting unit 502 first generates a sequence which serves ID and corresponds to each input port and each output port of the pieces of replicated ith structural data. The sequence is obtained by inserting a port-identifying value in the ith digit of (n−1)-digit sequence consisting of a group of numbers from the first to nth numbers excluding the ith number, where the port-identifying value identifies each input port or each output port in the ith structural data. The setting unit 502 then sets ID of each input port and each output port of the replicated ith structural data at the generated sequence.

Here, the processing of the setting unit 502 will be described. The setting unit 502 generates sequences each of which identifies a corresponding one of the pieces of replicated ith structural data, based on the (n−1)-digit sequence from the first to nth numbers excluding the ith number. For instance, the setting unit 502 generates a (n−1)-digit sequence of any one of natural numbers from 1 to the first number, . . . , any one of natural numbers from 1 to the (i−1)th number, . . . , any one of natural numbers from 1 to the (i+1)th number, . . . , and any one of natural numbers from 1 to the nth number. Since the number of possible values taken by the sequence exactly matches the number of replicated pieces of the ith structural data, it possible to identify each of the replicated pieces of the ith structural data by setting each of the generated sequences to a corresponding one of the replicated pieces of the ith structural data. The setting unit 502 then inserts any one of integers from 1 to the first number, in the ith digit of the generated sequence, where any one of the integers serves as a value that identifies each input port or each output port in the ith structural data, and sets the generated sequence after the insertion, to the each input port or the each output port. Consequently, different IDs are set to all the input ports of the replicated pieces of the first structural data to the nth structural data, respectively. The same goes for the output ports.

The generation unit 503 generates the connection information 110C indicating the connection relationship in which an output port and an input port having the same ID are coupled. Specifically, the connection information 110C indicates that an output port of the number j of output ports of each jth structural data of the pieces of the jth structural data is coupled to an input port of each (j+1)th structural data of the pieces of the (j+1)th structural data, which has the same ID as the output port. Here, j is any one of natural numbers from 1 to (n−1).

Next, Embodiment 3 will be described. In Embodiment 3, the processing performed by the replication unit 501 to the generation unit 503 is the same as the processing performed by Embodiment 2. However, each topological structure of the topological structure C has to satisfy all of the three conditions below. The first condition is that the number of layers in the topological structure C is an odd number greater than or equal to 3. The second condition is that the ith-type topological structure included in the topological structure C has the inverted topological structure of the (n−i+1)th-type topological structure, where i is a natural number of 1 to ((n−1)/2). Here, in a case where, when a first topological structure is placed on one side of a line and a second topological structure is placed on the other side of the line, the second topological structure is symmetric to the first topological structure with respect to the line, the second topological structure is called an inverted topological structure of the first topological structure. For instance, when n=5, the first-type topological structure and the fifth-type topological structure have an inverted relationship, and the second-type topological structure and the fourth-type topological structure have an inverted relationship. The third condition is that the ((n+1)/2)th-type topological structure has multiple switches that couples switches, and has a line symmetry with respect to a line that couples each of the multiple switches. The multiple switches are Spine switches illustrated in FIG. 2.

Next, the determination of a communication procedure that allows All-to-All communication to be performed without path conflict in the topological structure C will be described. When All-to-All communication is performed without path conflict, it is sufficient that the memory unit 510 store the connection information 110C and transfer pattern tables 111A, 111B.

In Embodiment 1 to 3, the identification unit 504 generates a combination of each of the first number of transfer patterns and each of the second number of transfer patterns. For a generated combination, when a transfer pattern of the combination is designated in the topological structure C indicated by the connection information 110C, the identification unit 504 then identifies a path from each of multiple transmission sources to a destination. In Embodiment 1, 2, for one combination, the identification unit 504 identifies paths in number equal to the number of transmission sources.

Furthermore, in Embodiment 3, when communication from each of multiple transmission sources is reflected by multiple switches included in the ((n+1)/2)th-type topological structure, a path from each of the multiple transmission sources to a destination is identified. Therefore, in Embodiment 3, for one combination, the identification unit 504 identifies paths in number equal to twice the number of transmission sources.

Based on the identified path corresponding to a combination, the determination unit 505 determines transfer patterns that allow All-to-All communication to be performed from the multiple transmission sources to the respective multiple destinations without path conflict in the topological structure C. In addition, based on the identified path corresponding to a combination, the determination unit 505 determines an output port corresponding to a combination of a transmission source and a destination in each topological structure in the topological structure C.

The transmission unit 506 transmits transfer patterns to each of multiple transmission sources, the transfer patterns allowing All-to-All communication to be performed from the multiple transmission sources to the respective multiple destinations without path conflict in the topological structure C. In addition, the transmission unit 506 transmits information indicating an output port corresponding to a combination of a transmission source and a destination in each topological structure in the topological structure C, to a switch group included in the topological structure.

Figure 6:
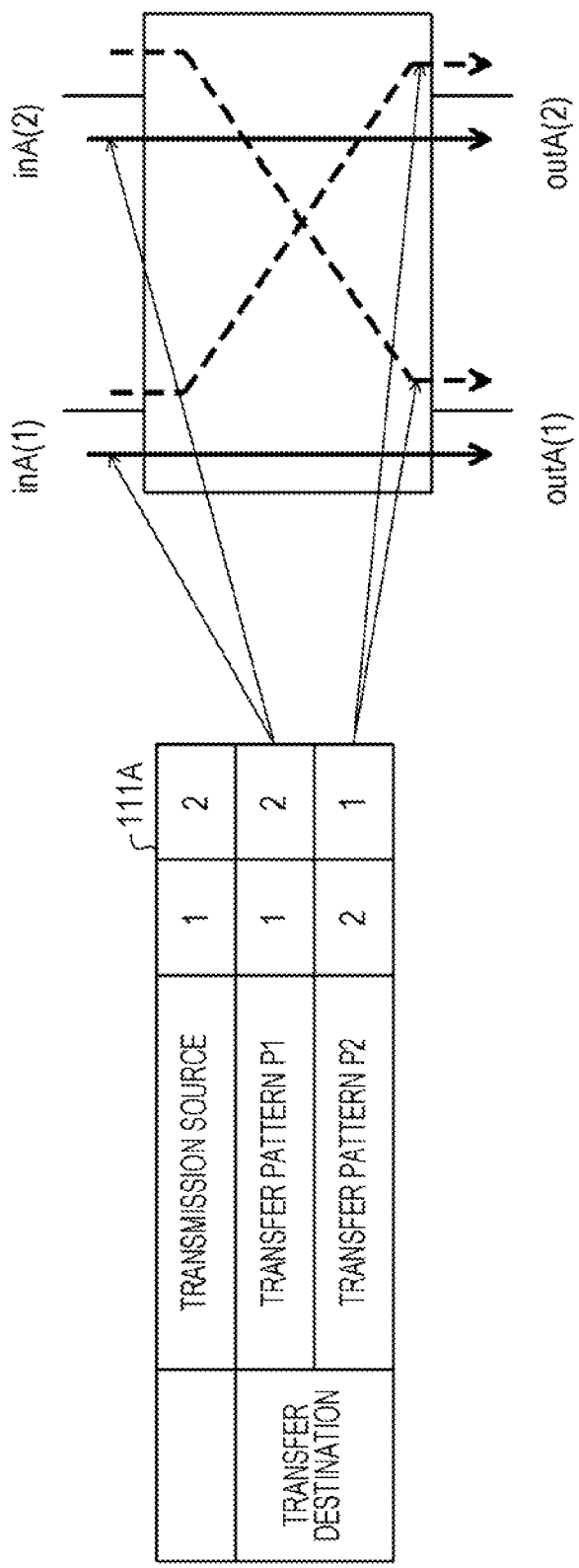
FIG. 6 is a diagram illustrating an example of memory contents of a transfer pattern table, according to an embodiment.

FIG. 6 is an explanatory diagram illustrating an example of memory contents of the transfer pattern table 111. As an example, FIG. 6 illustrates the transfer pattern table 111A of the topological structure A having two input ports and two output ports. In FIG. 6, let inA(1), inA(2) be the two input ports of the topological structure A, and outA(1), outA(2) be the two output ports of the topological structure A.

The transfer pattern table 111A has transfer patterns P1, P2. The transfer pattern P1 transfers the data received from inA(1) by using outA(1), and transfers the data received from inA(2) by using outA(2). Also, the transfer pattern P2 transfers the data received from inA(2) by using outA(1), and transfers the data received from inA(1) by using outA (2). In FIG. 6, solid line arrows indicate the flow of data transfer in accordance with the transfer pattern P1, and dashed line arrows indicate the flow of data transfer in accordance with the transfer pattern P2.

Embodiment 1

In Embodiment 1, it is assumed that the topological structure A having a transmission source servers and a destination servers, and the topological structure B having b transmission source servers and b destination servers are given, and transfer patterns without conflict $Pi(1 \leq i \leq a)$, $Qj(1 \leq j \leq b)$ are given. In this case, the information processing apparatus 101 generates a new topological structure C that satisfies the following three conditions. The first condition is that each switch used in the topological structure C is the same as the topological structures A, B. The second condition is that the number of hops from a transmission source server to a destination server in the topological structure C is the sum of the number of hops of the topological structure A and the number of hops of the topological structure B. The third condition is that one-way All-to-All communication is possible without path conflict in the topological structure C.

Figure 7:
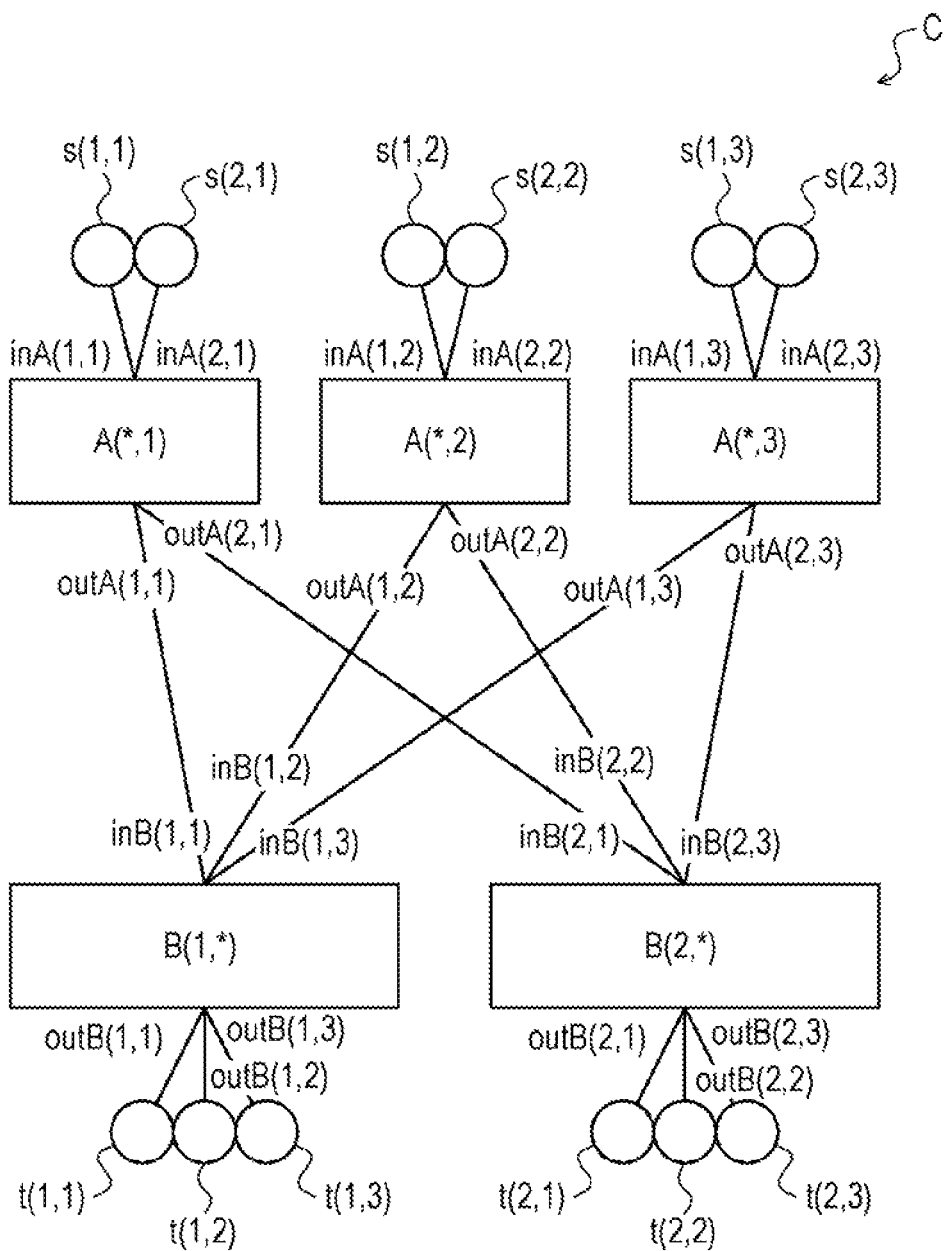
FIG. 7 is a diagram illustrating an example of generation of connection information, according to an embodiment.

FIG. 7 is an explanatory diagram illustrating example generation of the connection information 110C in Embodiment 1. The example of FIG. 7 illustrates the topological structure C when a=2 and b=3. First, the information processing apparatus 101 replicates b pieces of the structural data 511A. The information processing apparatus 101 then sets IDs of the replicated pieces of the structural data 511A, at A(*, 1), A(*, 2), ..., A(*, b), respectively. Also, the information processing apparatus 101 sets pairs of an input port and an output port of A(*, j) $(1 \leq j \leq b)$, at a pair of inA(1, j) and outA(1, j), a pair of inA(2, j) and outA(2, j), ..., a pair of inA(a, j) and outA(a, j), respectively.

Similarly, the information processing apparatus 101 replicates a pieces of the structural data 511B. The information processing apparatus 101 then sets IDs of the replicated pieces of the structural data 511B, at B(1, *), B(2, *), ..., B(a, *), respectively. Also, the information processing apparatus 101 sets b pairs of input and output ports of B (i, *) $(1 \leq i \leq a)$, at a pair of inB(i, 1) and outB(i, 1), a pair of inB(i, 2) and outB(i, 2), ..., a pair of inB(i, b) and outB(i, b), respectively.

Then, the information processing apparatus 101 couples outA(i, j) and inB(i, j) having the same symbols in parentheses as the same link. Also, the information processing apparatus 101 may identify the structural data 511B having the symbols in parentheses matching with "*, j" of A(*, j) as the structural data 511B coupled to A(*, j). Here, "*" is a symbol to be considered matched for any numerical value. In the case of Embodiment 1, each of A(*, 1), A(*, 2), ..., A(*, b) is coupled to all of B(1, *), B(2, *), ..., B(a, *).

Next, the information processing apparatus 101 couples the input server s(i, j) to a higher link of A(*, j) $(1 \leq j \leq b)$. Also, the information processing apparatus 101 couples the output server t(i, j) to a lower link of B(i, *) $(1 \leq i \leq a)$.

The example of FIG. 7 illustrates the topological structure C when a=2 and b=3. As illustrated in FIG. 7, each of A(*, 1), A(*, 2), and A (*, 3) is coupled to all of B(1, *) and B(2, *). The information processing apparatus 101 outputs the connection information 110C (a wire connection table) indicating the connection relationship between the topological structures A and B. An administrator of the topological structure C constructs the topological structure C in accordance with the outputted wire connection table.

Figure 8:
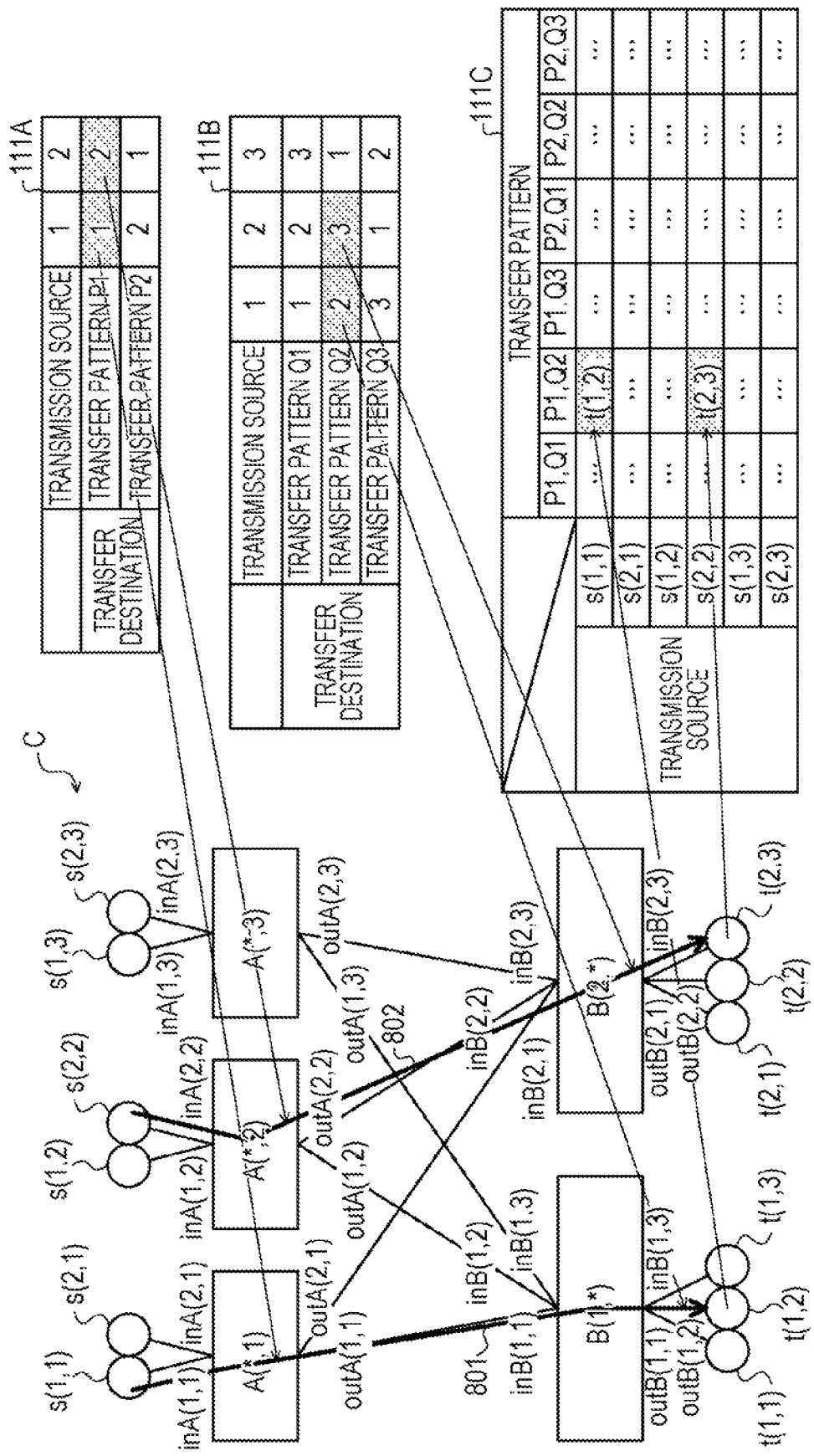
FIG. 8 is a diagram illustrating an example of generation of a transfer pattern table for a topological structure, according to an embodiment.

Next, an example of a table to be generated to perform All-to-All communication without path conflict in the constructed the topological structure C will be described using FIGS. 8 and 9. In FIG. 8, an example of generation of a transfer pattern table in the topological structure C is explained, and in FIG. 9, an example of generation of an output port table in the switches in the topological structure C.

FIG. 8 is an explanatory diagram illustrating an example of generation of the transfer pattern table 111C in the topological structure C. The information processing apparatus 101 generates a transfer pattern table of the topological structure C by using the connection information 110C on the topological structure C, the transfer pattern table 111A of the topological structure A, and the transfer pattern table 111B of the topological structure B. Here, the transfer pattern table 111A includes a transfer patterns, and the transfer pattern table 111B includes b transfer patterns. Hereinafter, let a transfer patterns held by the transfer pattern table 111A be P1, P2, . . . , Pa. Similarly, let b transfer patterns held by the transfer pattern table 111B be Q1, Q2, . . . , Qb.

Since there are a×b transfer patterns in all, the information processing apparatus 101 applies (Pi, Qj) (i=1, 2, . . . , a, j=1, 2, . . . , b) patterns in accordance with the connection information 110C, and identifies the output server t which is a destination of the input server s corresponding to each pattern. Here, (Pi, Qj) pattern is such that transfer pattern Pi is applied for all A(*, j) (j=1, 2, . . . , b) in the topological structure C, and transfer pattern Qj is applied for all B(i, *) (i=1, 2, . . . , a). From the identified output server t, the information processing apparatus 101 generates the transfer pattern table 111C of the topological structure C, which indicates the output server t corresponding to a combination of a transfer pattern and a transmission source. Hereinafter, an example of (Pi, Qj) pattern is illustrated, and an example of generation of the transfer pattern table 111C is illustrated using FIG. 8.

All transfer patterns held by the topological structure C illustrated in FIG. 8 are 6 transfer patterns because a=2, b=3. In FIG. 8, (P1, Q2) pattern out of 6 transfer patterns is described. First, an example in which a transmission source is the input server s(1, 1) is illustrated. In the case of the transfer pattern P1, the information processing apparatus 101 refers to the transfer pattern table 111A, and identifies that transmission from inA(1, 1) in the topological structure A(*, 1) is transferred to outA(1, 1).

Here, as described in FIG. 1, the information processing apparatus 101, when referring to the transfer pattern table 111, focuses attention on the component at the position of "*" out of symbols in parentheses assigned to a topological structure. Therefore, the information processing apparatus 101 identifies that transmission from inA(1, 1) corresponds to the transmission source "1" in the transfer pattern table 111A, and identifies the transfer destination "1" in the transfer pattern P1. The information processing apparatus 101 then identifies that transmission from inA(1, 1) is transferred to outA(1, 1) which corresponds to the transfer destination "1".

Next, the information processing apparatus 101 refers to the connection information 110C, and identifies that the input port coupled to outA(1, 1) is inB(1, 1) of the topological structure B(1, *). The information processing apparatus 101 then refers to connection information 111B, and identifies that transmission from inB(1, 1) of the topological structure B(1, *) is transferred to outB(1, 2). Here, using the same technique in the description given to the topological structure A(*, 1), the information processing apparatus 101, when referring to the transfer pattern table 111B, focuses attention on the second components of inB, outB. The information processing apparatus 101 then identifies that transmission from the input server s(1, 1) is finally transferred to the output server t(1, 2) connected to outB(1, 2).

Consequently, the information processing apparatus 101 identifies a path 801 from s(1, 1) to t(1, 2) in (P1, Q2) pattern.

Since the path 801 has been identified, the information processing apparatus 101 determines the combination of s(1, 1) and t(1, 2) in (P1, Q2) pattern, based on the path 801. The combination of s(1, 1) and t(1, 2) is an element of the transfer pattern table 111C. Thus, the information processing apparatus 101 registers "t(1, 2)" in a corresponding field of the transfer pattern table 111C. Similarly, in FIG. 8, the information processing apparatus 101 identifies that a transmission source of the input server s(2, 2) leads to a destination at the output server t(2, 3). Thus, the information processing apparatus 101 identifies a path 802 from s(2, 2) to t(2, 3) in (P1, Q2) pattern. Since the path 802 has been identified, the information processing apparatus 101 registers "t(2, 3)" in a corresponding field of the transfer pattern table 111C. The information processing apparatus 101 applies a similar procedure for other transmission sources, other transfer patterns, and registers all destinations in the transfer pattern table 111C.

When the destinations of the transfer pattern table 111C are all registered, the information processing apparatus 101 transmits the transfer pattern table 111C to the input servers s whose number is 6.

Figure 9:
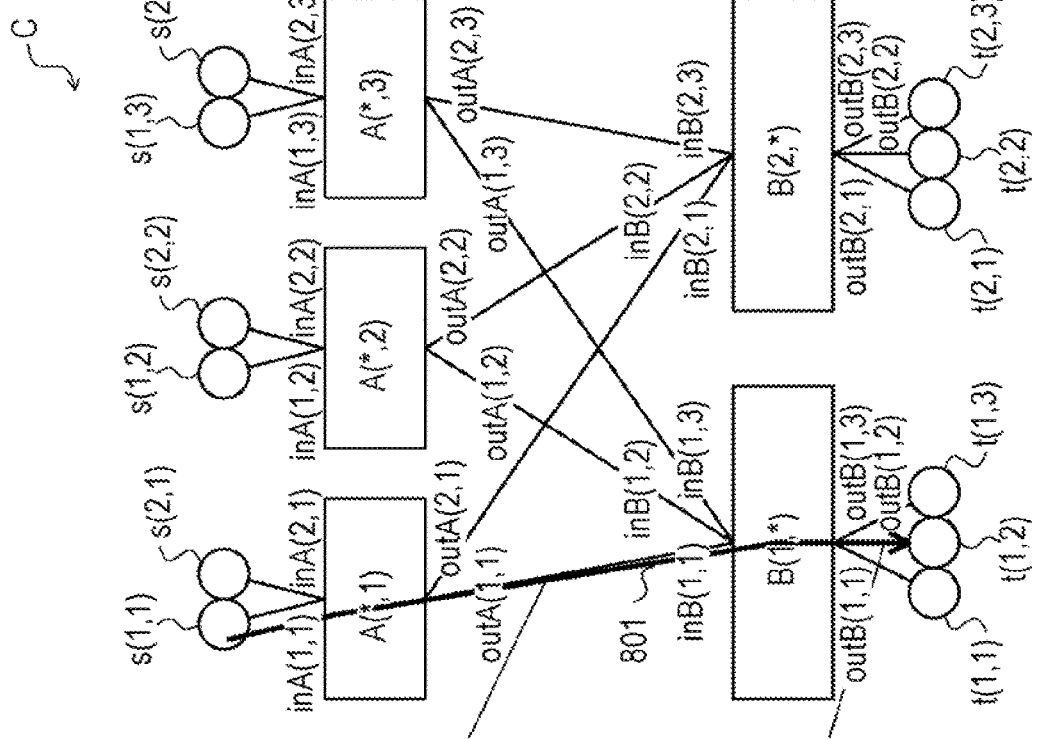
FIG. 9 is a diagram illustrating an example of generation of an output port table in each topological structure, according to an embodiment.

FIG. 9 is an explanatory diagram illustrating an example of generation of the output port table 112 in each topological structure in the topological structure C. The information processing apparatus 101 executes setting processing of each destination of the transfer pattern table 111C, and generating processing of the output port table of each switch. FIG. 9 illustrates an example of generation of the output port table 112A(*,1) of the topological structure A(*, 1), and the output port table 112B(1, *) of the topological structure B(1, *).

The example of FIG. 9 illustrates a state after the information processing apparatus 101 identifies a path 801. In this case, the information processing apparatus 101 identifies the output port of a topological structure on the path 801. For instance, for the topological structure A(*, 1), the information processing apparatus 101 identifies that the output port of a topological structure on the path 801 is outA(1, 1). Thus, the information processing apparatus 101 registers "outA(1, 1)" in the output port table 112A(*, 1) in association with the combination of transmission source s(1, 1) and destination t(1, 2). Similarly, for the topological structure B(1, *), the information processing apparatus 101 identified that the output port of topological structure on the path 801 is outB(1,2). Thus, the information processing apparatus 101 registers "outB(1, 2)" in the output port table 112B(1, *) in association with the combination of transmission source s(1, 1) and destination t(1, 2).

Similarly, when an output port corresponding to the combination of a transmission source and a destination is identified for each topological structure in the topological structure C, the information processing apparatus 101 sets the identified output port in a corresponding field in the output port table 112B of each topological structure. When all output ports of each the topological structure are set, the information processing apparatus 101 transmits the output port table 112 corresponding to each topological structure to the topological structure.

The information processing apparatus 101 transmits the transfer pattern table 111C to 6 input servers s, transmits the output port table 112 corresponding to each topological structure to the topological structure, and thus the 6 input servers s may perform All-to-All communication without path conflict.

Next, a proof that the topological structure C described in Embodiment 1 allows All-to-All communication to be performed without path conflict will be described. Here, the number of times of transmission from transmission source server s(x, y) to destination server t(z, w) is counted. First, the topological structure to which data is transmitted from transmission source server s(x, y) is limited to the topological structure A in the topological structure C(*, y). Similarly, the topological structure from which data is transmitted to destination server t(z, w) is limited to the topological structure B in the topological structure C(z, *). The topological structure A(*, y) and the topological structure B(z, *) are coupled via only one link outA(z, y)=inB(z, y). Thus, the number of times of transmission from transmission source server s(x, y) to destination server t(z, w) is only one time.

Embodiment 2

In Embodiment 1, an example of the topological structure C formed of two-layer topological structures A, B has been described. However, in Embodiment 2, an example of the topological structure C formed of three-layer or higher layer topological structures will be described.

Figure 10:
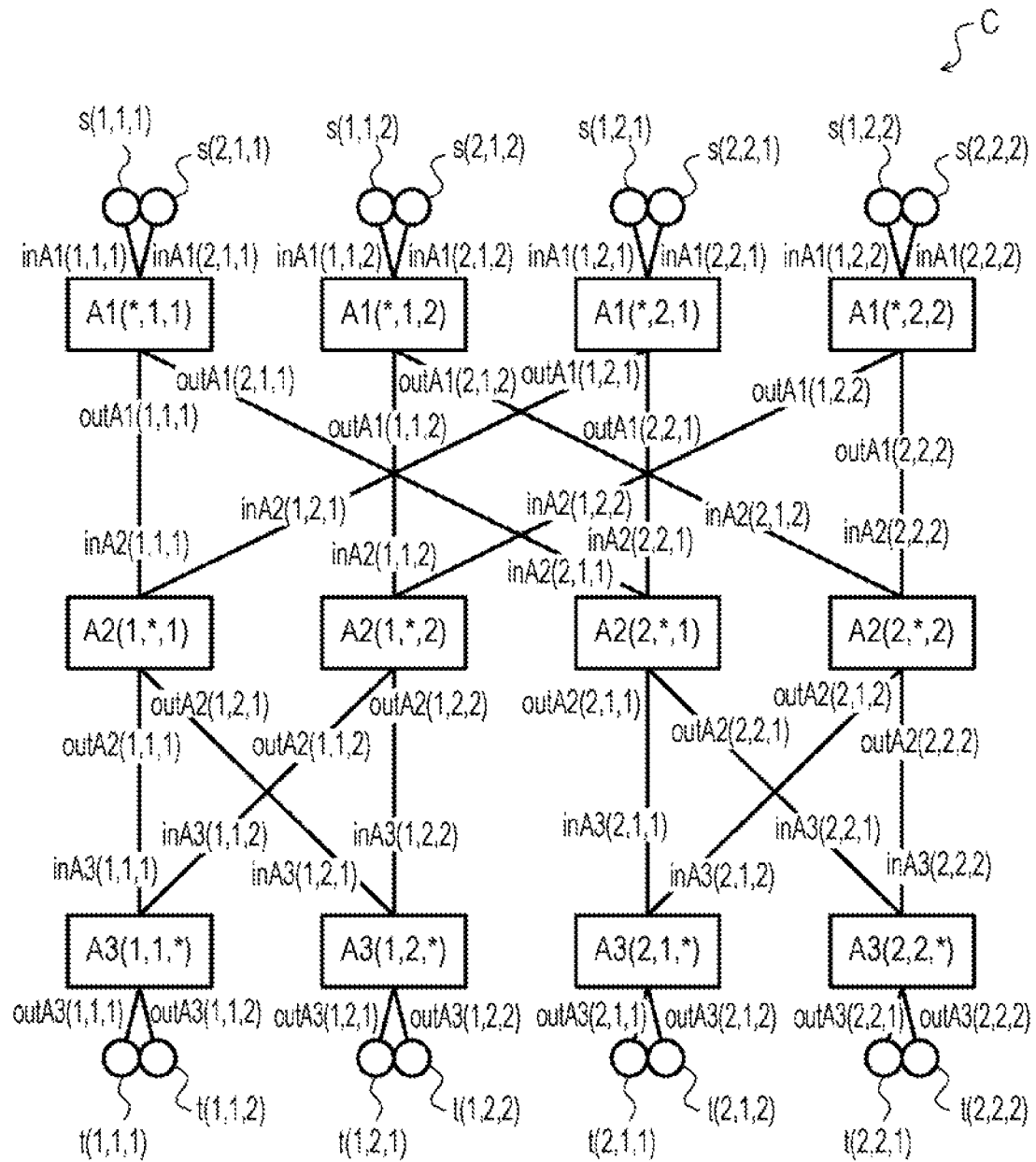
FIG. 10 is a diagram illustrating an example of generation of connection information, according to an embodiment.

FIG. 10 is an explanatory diagram illustrating an example of generation of the connection information 110C in Embodiment 2. In Embodiment 2, it is assumed that the topological structure A1 with a1 transmission source servers and a1 destination servers, the topological structure A2 with a2 transmission source servers and a2 destination servers, . . . , the topological structure An with an transmission source servers and an destination servers are provided, where n is an integer whose value is 2 or greater. When n is 2, the same topological structures in Embodiment 1 is obtained.

First, in the information processing apparatus 101, the number P of input servers and output servers of a new topological structure C formed of p-layer topological structure is a1•a2•, . . . •an. The information processing apparatus 101 then replicates P/ai pieces of the structural data 511Ai that indicates the topological structure Ai (i=1, 2, . . . , n).

The information processing apparatus 101 sets IDs of the pieces of replicated the structural data 511Ai, at Ai(j1, j2, . . . , j(i−1), *, j (i+1), . . . , jn). In the sequence "j1, j2, . . . , j(i−1), *, j (i+1), . . . , jn", the ith component is "*", and other component jk (k=1, 2, . . . , n) satisfies 1≤jk≤ak. When the number of possible j is calculated, the result matches P/ai.

Also, the information processing apparatus 101 sets the input ports of A(j1, j2, . . . , j(i−1), *, j(i+1), . . . , jn), at inAia(j1, j2, . . . , j(i−1), k, j (i+1), . . . , jn) (k=1, 2, . . . , ai). Similarly, the information processing apparatus 101 sets the output ports of A(j1, j2, . . . , j(i−1), *, j (i+1), . . . , jn), at outAi(j1, j2, . . . , j(i−1), k, j (i+1), . . . , jn) (k=1, 2, . . . , ai).

Next, the information processing apparatus 101 couples outAi and inA(i+1) in the same symbols in parentheses as the same link. Alternatively, the information processing apparatus 101 may identify that the structural data 511A(i+1) having symbols in parentheses matching the symbols in parentheses of Ai is structural data 511 to be coupled to Ai.

Here, a specific example of processing of connection between an input port and an output port is illustrated using FIG. 10. In FIG. 10, it is assumed that n=3, and a1=a2=a3=2. Therefore, P=2×2×2=8. Next, the information processing apparatus 101 replicates, 4 times, each of the structural data 511A1 to 511A3. The information processing apparatus 101 sets IDs of the replicated 4 pieces of A1, at A1(*, 1, 1), A1(*, 1, 2), A1(*, 2, 1), A1(*, 2, 2). Similarly, the information processing apparatus 101 sets IDs of the replicated 4 pieces of A2, at A2(1, *, 1), A2(1, *, 2), A2(2, *, 1), A2(2, *, 2). Also, the information processing apparatus 101 sets IDs of the replicated 4 pieces of A3, at A3(1, 1, *), A3(1, 2, *), A3(2, 1, *), A3(2, 2, *). In addition, the information processing apparatus 101 sets the input ports and output ports of A1(*, 1, 1), at inA1(1, 1, 1), inA1(2, 1, 1), and outA1(1, 1, 1), outA1(2, 1, 1), respectively. The information processing apparatus 101 sets IDs to other input ports and output ports by the same command rule.

The information processing apparatus 101 then couples outAi and inA(i+1) in the same symbols in parentheses as the same link. For instance, outA1(1, 1, 1) and inA2(1, 1, 1) are coupled as the same link. Alternatively, the information processing apparatus 101 may identify that the structural data 511A(i+1) having symbols in parentheses matching the symbols in parentheses of Ai is structural data 511 to be connected to Ai. For instance, A2 which has the same symbols in parentheses as A1(*, 1, 1) is given by A2(1, *, 1) and A2(2, *, 1). As shown in FIG. 10, in three-layer or higher layer topological structure, topological structures, which are on adjacent layers and not coupled, are also included.

Other pieces of structural data 511 are coupled to each other, and the information processing apparatus 101 thereby obtains the topological structure C illustrated in FIG. 10. After the topological structure C is obtained, in order to perform All-to-All communication without path conflict in the constructed topological structure C, the information processing apparatus 101 generates a transfer pattern table and an output port table. The method of generating these two tables follows the same processing as in Embodiment 1, thus a description thereof is omitted.

In Embodiment 2, when the input server s(j1, j2, . . . , jn) performs transmission to the output server t(k1, k2, . . . , kn), just one component of "j1, j2, . . . , jn" is corrected in each topological structure. Therefore, it is possible for all the input servers s to perform transmission to all the output servers t.

Next, the flowcharts for connection information generation processing for the topological structure C, and generation processing for the transfer pattern table and output port table in Embodiment 1, 2 will be described using FIGS. 11 and 12.

Figure 11:
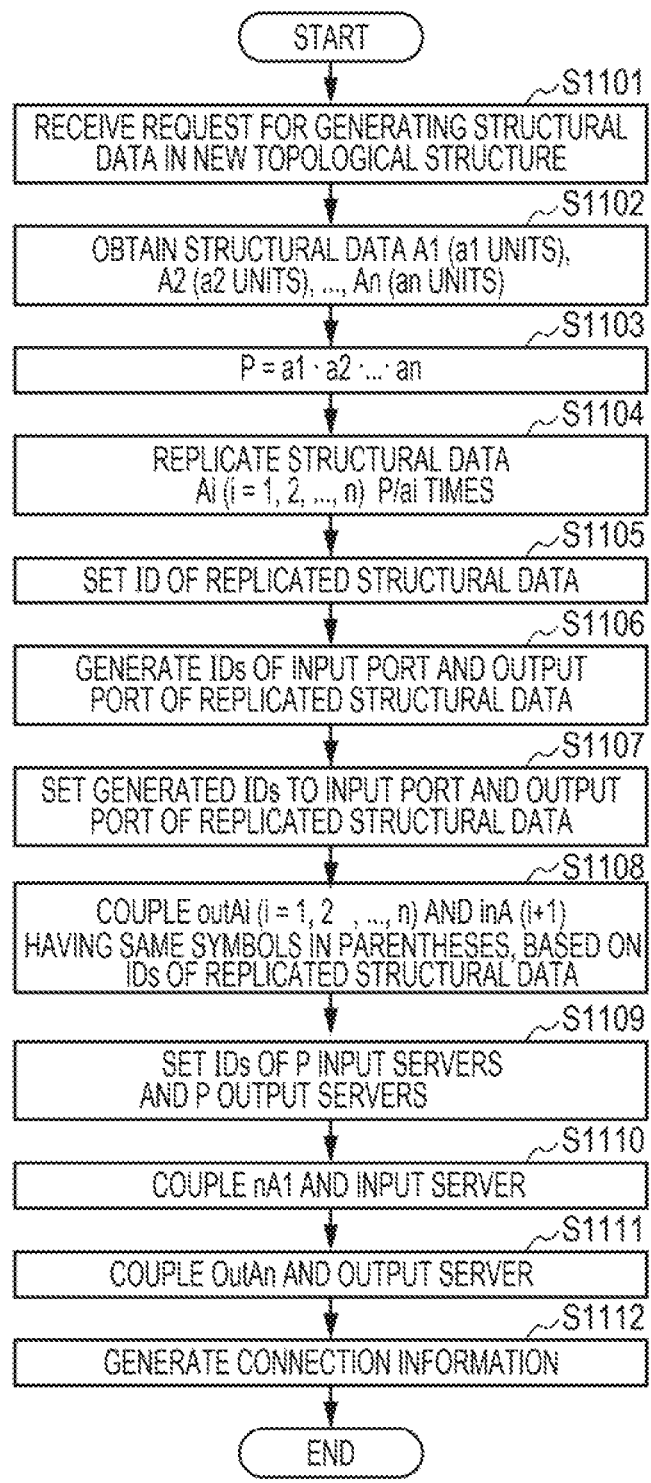
FIG. 11 is a diagram illustrating an example of an operational flowchart for a process of generating connection information for a topological structure, according to an embodiment.

FIG. 11 is an explanatory diagram illustrating an example of connection information generation processing procedure of topological structure. The information processing apparatus 101 receives a request for generating structural data in a new topological structure by an operation of a user of the information processing apparatus 101 (step S1101). The generation request includes an instruction as to the number of layers in which a new topological structure is to be constructed, and information that specifies a topological structure at each layer. Here, it is assumed that the new topological structure is constructed with n-layer topological structures and topological structures in respective layers are the topological structures A1, A2, . . . , An, where n is a natural number whose value is 2 or greater.

The information processing apparatus 101 obtains structural data A1 (a1 pieces), A2 (a2 pieces), . . . , An (an pieces) from the memory unit 510 according to the generation request (step S1102). Next, the information processing apparatus 101 calculates the value of a1•a2• . . . •an, and substitutes the value for P (step S1103). The information processing apparatus 101 replicates structural data Ai (i=1, 2, . . . , n) P/ai times (step S1104). Next, the information processing apparatus 101 sets IDs of the replicated pieces of structural data (step S1105).

The information processing apparatus 101 then generates IDs of input port inAi and output port outAi of the replicated structural data (step S1106). Next, the information processing apparatus 101 sets the generated IDs to input port inAi and output port outAi of the replicated structural data (step S1107). The information processing apparatus 101 couples outAi (i=1, 2, . . . , n) and inA (i+1) having the same symbols in parentheses based on the set IDs of input port inAi and output port outAi (step S1108).

Next, the information processing apparatus 101 sets IDs of P input servers s and P output servers t (step S1109). The information processing apparatus 101 then couples InA1 and the input servers s (step S1110). Also, the information processing apparatus 101 couples OutAn and the output servers t (step S1111). The information processing apparatus 101 generates connection information 110C including the replicated topological structures A1, A2, . . . , An, input servers s and the output servers t, and connection relationship between each topological structure and servers (step S1112). After completion of the processing in step S1112, the information processing apparatus 101 completes the connection information generation processing for the topological structures.

Figure 12:
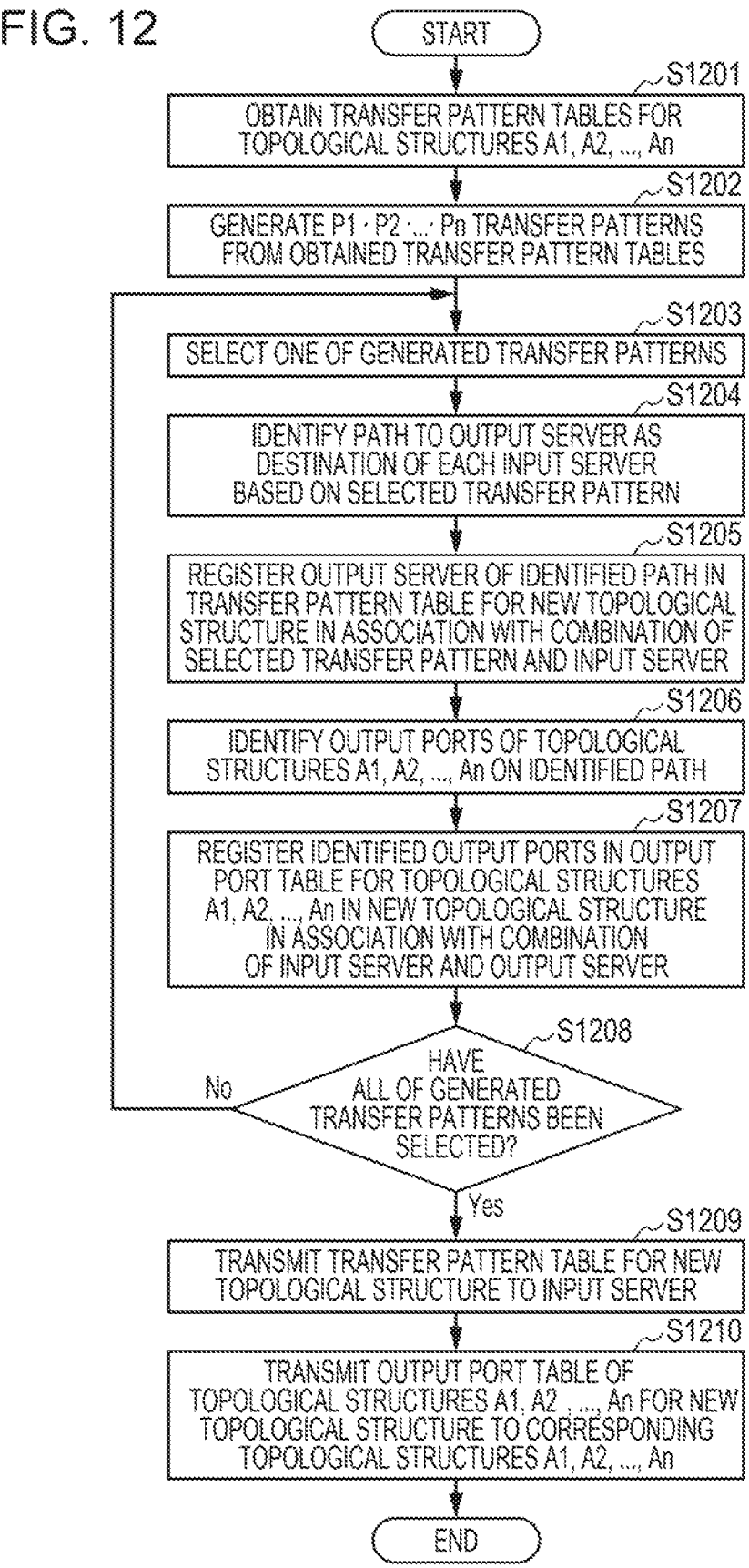
FIG. 12 is a diagram illustrating an example of an operational flowchart for a process of generating a transfer pattern table and an output port table, according to an embodiment.

FIG. 12 is an explanatory diagram illustrating an example of a procedure for generating a transfer pattern table and an output port table. The information processing apparatus 101 obtains the transfer pattern tables 111 of the topological structures A1, A2, . . . , An from the memory unit 510 (step S1201). Here, it is assumed that the transfer pattern table 111 of the topological structure A1 includes P1 transfer patterns, the transfer pattern table 111 of the topological structure A2 includes P2 transfer patterns, . . . , the transfer pattern table 111 of the topological structure An includes Pn transfer patterns.

Next, the information processing apparatus 101 generates, from the obtained transfer pattern tables, transfer patterns whose number is P1•P2• . . . •Pn (step S1202). The information processing apparatus 101 then selects one of the generated transfer patterns (step S1203). Next, for each input server s, the information processing apparatus 101 identifies a path to the output server t which is a destination of the input server s, in accordance with the selected transfer pattern (step S1204). The information processing apparatus 101 registers the output server t of the identified path in the transfer pattern table for a new topological structure, in association with the combination of the selected transfer pattern and the input server s (step S1205).

Also, the information processing apparatus 101 identifies output ports of the topological structures A1, A2, . . . , An on the identified path (step S1206). The information processing apparatus 101 registers the identified output ports in the output port tables of the topological structures A1, A2, . . . , An in the new topological structure, in association with the combination of the input server and output server (step S1207).

Next, the information processing apparatus 101 determines whether or not all of the generated transfer patterns have been selected (step S1208). When some of the generated transfer patterns have not been selected (No in step S1208), the flow proceeds to the processing in step S1203. On the other hand, when all of the generated transfer patterns have been selected (Yes in step S1208), the information processing apparatus 101 transmits a transfer pattern table for the new topological structure, to the input server s (step S1209). In addition, the information processing apparatus 101 transmits the output port tables of the topological structures A1, A2, . . . , An for the new topological structure, to the corresponding topological structures A1, A2, . . . , An (step S1210). After completion of the processing of step S1210, the information processing apparatus 101 terminates the processing for generating the transfer pattern table and output port table.

Embodiment 3

A topological structure that provides one-way All-to-All communication without path conflict has been described in Embodiment 1, 2. In Embodiment 3, a topological structure that provides two-way All-to-All communication without path conflict will be described. In two-way All-to-All communication without path conflict, in addition to one-way All-to-All communication without path conflict, it is possible to perform communication from an input server group to an input server group and from an output server group to an output server group without path conflict.

Figure 13:
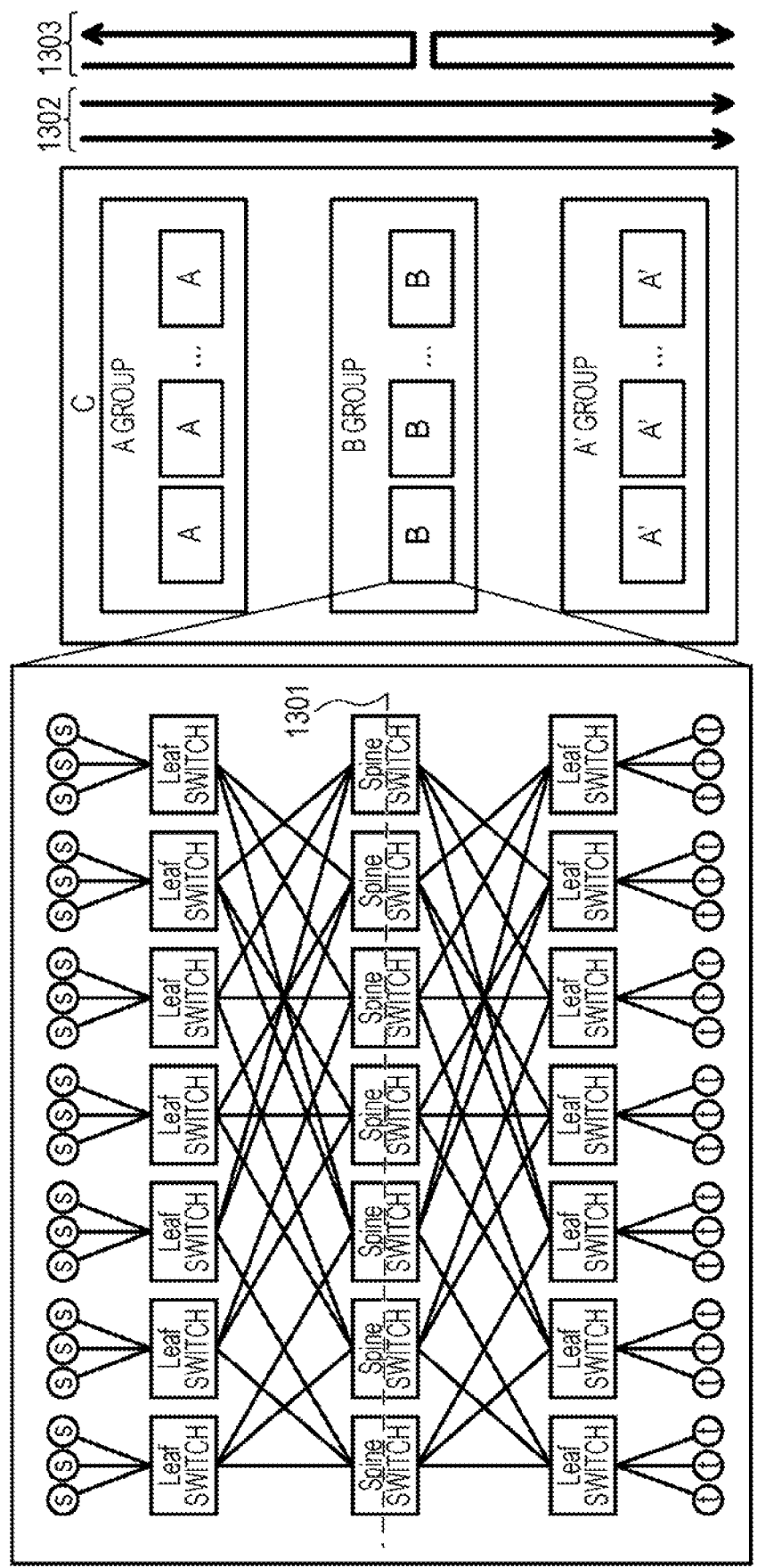
FIG. 13 is a diagram illustrating an example of generation of connection information, according to an embodiment.

FIG. 13 is a diagram illustrating an example of generation of the connection information 110C in Embodiment 3. When a topological structure has a line symmetry with respect to Spine switches in the middle layer of the topological structure, the topological structure is referred to as a "line symmetry topological structure". For instance, a Fat-Tree and a Latin square Fat-Tree have a line symmetry topological structure. When a line symmetry the topological structure allows one-way All-to-All communication without path conflict, it is possible to construct a topological structure that allows two-way All-to-All communication without path conflict, by causing communication data to turn around at the Spine switches.

FIG. 13 illustrates an example of the topological structure C with which to perform All-to-All communication without path conflict in two ways. The topological structure C includes a topological structure A group, a topological structure B group, and a topological structure C group. Here, the topological structure A' is obtained by inverting the topological structure A. The topological structure B has a line symmetry topological structure. For instance, the topological structure B is Latin square Fat-Tree as illustrated in FIG. 13. As illustrated in FIG. 13, Latin square Fat-Tree has line symmetry with respect to a dotted line 1301 which is formed by coupling Spine switches.

After connection information C on a new topological structure C is obtained, in order to perform All-to-All communication without path conflict in a constructed the topological structure C, the information processing apparatus 101 generates a transfer pattern table and an output port table. The method of generating these two tables follows the same processing as in Embodiment 1, thus a description thereof is omitted. As different processing, in the processing in step S1204, the information processing apparatus 101 identifies a path 1302 to the output server t as a destination of each input server s, and identifies a path 1303 when each communication from the multiple transmission sources is turned around at the dotted line 1301 illustrated in FIG. 13. Here, the portion at which communication is turned around is Spine switches on dotted line 1301. In step S1205, S1207, when registration is made in the transfer pattern table 111, the output port table 112, it is sufficient that the information processing apparatus 101 prepare a transfer pattern table and an output port table for each of both cases where communication is not turned around and where communication is turned around.

As described above, based on a path from each of multiple transmission sources to a destination, which is identified for each combination of transfer patterns of the respective topological structures in the topological structure C, the information processing apparatus 101 determines transfer patterns of the topological structure C and an output port of each topological structure. This allows each of the multiple transmission sources to perform All-to-All communication without path conflict in the topological structure C.

Also, the information processing apparatus 101 may generate the connection information 110C indicating connection relationship in which each output port of the replicated second number of pieces of the structural data 511A is coupled to one of the second number of input ports of the replicated first number of pieces of the structural data 511B. Also, the information processing apparatus 101 may set IDs to the output port of each replicated structural data 511A and the input port of each replicated structural data 511B, and may generate the connection information 110C indicating connection relationship in which ports with the same ID are coupled. Consequently, the information processing apparatus 101 may provide an administrator of the topological structure C with the connection information 110C serving as a connection method for two-layer topological structure C that allows All-to-All communication to be performed without path conflict, without increasing the number of switches for servers. The administrator of the topological structure C then follows the provided connection information 110C, thereby making it possible to construct the topological structure C that allows All-to-All communication to be performed without path conflict.

Here, as indicated in FIG. 7, the topological structure C does not use a switch other than the switches originally included in the topological structures A, B. This means that the number of switches for servers is not increased. In addition, the information processing apparatus 101 may extend a topological structure that allows All-to-All communication to be performed without path conflict, based on different topological structures.

Also, the information processing apparatus 101 may set ID to each output port and each input port of replicated structural data Ai(i=1, 2, . . . , n), and may generate connection information 110 indicating connection relationship in which ports with the same ID are coupled between adjacent layers. This allows the information processing apparatus 101 to provide an administrator of the topological structure C with a connection method for n-layer topological structure C that enables All-to-All communication to be performed without path conflict.

Also, the information processing apparatus 101 may generate connection information 110 in which the ith-type topological structure is an inverted topological structure of the (n−i+1)th-type topological structure, and the ((n+1)/2) th-type topological structure has line symmetry, where the n is an odd number that is 3 or greater. Consequently, the information processing apparatus 101 may provide an administrator of the topological structure C with a connection method for a topological structure that allows All-to-All communication to be performed without path conflict in two-way.

Also, the information processing apparatus 101 identifies a path from each of multiple transmission sources to a destination, which is identified for each combination of transfer patterns of the respective topological structures in the topological structure C, and a path that is turned around at Spine switches in the ((n+1)/2)th-type topological structure. This allows each of the multiple transmission sources to perform two-way All-to-All communication without path conflict in the topological structure C.

Also, the information processing apparatus 101 may transmit the transfer pattern table 111 to the input server s as well as the output port table 112 to switches of the respective topological structures in the topological structure C. This allows each of the multiple transmission sources to perform All-to-All communication without path conflict in the topological structure C, without manually setting the transfer pattern table 111 and the output port table 112. Also, an administrator of the topological structure C may review the transfer pattern table 111 and the output port table 112, and may manually assign setting for each of the multiple transmission sources and switches of the respective topological structures in the topological structure C.

It is to be noted that the communication procedure determination method described in the embodiments may be achieved by a computer such as a personal computer or a workstation that causes a prepared program to be executed. The program is recorded on a computer-readable recording medium such as a hard disk, a flexible disk, a compact disc-read only memory (CD-ROM), a digital versatile disk (DVD), and is read from the recording medium and executed by a computer. The program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory configured to:
store connection information indicating connection relationship between topological structures in a network, in which each of first-type topological structures is coupled to each of second-type topological structures, each of the first-type topological structures including first output ports and first input ports to which a plurality of transmission sources are coupled, respectively, and each of the second-type topological structures including second input ports and second output ports to which a plurality of destinations are coupled, respectively, and
store first transfer patterns each indicating a combination of the first input ports and the first output ports for performing all-to-all communication without path conflict in each of the first-type topological structures, and second transfer patterns each indicating a combination of the second input ports and the second output ports for performing all-to-all communication without path conflict in each of the second-type topological structures; and
a processor coupled to the memory and configured to:
determine, based on the connection information, a first number of the second-type topological structures and a second number of the first-type topological structures, where a third number of the first input ports and a fourth number of the first output ports both equal the first number, and a fifth number of the second input ports and a sixth number of the second output ports both equal the second number,
identify a plurality of paths from the plurality of transmission sources to the plurality of transmission destinations in the network indicated by the connection information, in association with a combination of a first transfer pattern among the first transfer patterns and a second transfer pattern among the second transfer patterns,
based on the identified plurality of paths, determine a third transfer pattern with which to perform all-to-all communication without path conflict from the plurality of transmission sources to the plurality of transmission destinations in the network, and determine output ports of each of the second number of first-type topological structures and of each of the first number of second-type topological structures in the network, corresponding to the identified plurality of paths in the network.

2. The apparatus of claim 1, wherein
the memory is further configured to:
    store first structural data indicating the first-type topological structure, and
    store second structural data indicating the second-type topological structure; and
the processor is further configured to:
    upon receiving a request for generating the connection information indicating connection relationship between topological structures in the network including the first-type topological structure and the second-type topological structure, replicate the first structural data the second number of times, and replicate the second structural data the first number of times; and
    generate the connection information indicating connection relationship in which each of the first number of output ports indicated by each of the replicated second number of pieces of the first structural data is coupled to one of the second number of input ports indicated by each of the replicated first number of pieces of the second structural data.

3. The apparatus of claim 2, wherein the processor is further configured to:
    set identification information of each of the first number of output ports in each of the replicated second number of pieces of the first structural data, at information obtained by combining a value identifying the each output port in the first structural data and a value based on the second number;
    set identification information of each of the second number of input ports in each of the replicated first number of pieces of the second structural data, at information obtained by combining a value based on the first number and a value identifying the each input port in the second structural data; and
    generate the connection information indicating connection relationship in which each of the first number of output ports indicated by each of the replicated second number of pieces of the first structural data is coupled to a first input port having same identification information as the each output port, among the second number of input ports indicated by each of the replicated first number of pieces of the second structural data, the identification information of the first input port being identical to the identification information of the each output port.

4. The apparatus of claim 3, wherein
the memory is configured to store first to nth pieces of structural data respectively indicating the first-type to nth-type topology structures, where n is a natural number whose value is 2 or more, and
the processor is configured to:
    upon receiving a request for generating connection information indicating connection relationship among topological structures in the network having n types of topological structures that includes the first-type topological structure having the first number of input ports and the first number of output ports, up to a nth-type topological structure having a number n of input ports and the number n of output ports, replicate ith structural data indicating ith-type topological structure d times, where i is a natural number ranging from 1 to n, and d is a natural number obtained by dividing a product of the first number to the nth number by i,
    for each input port and each output port indicated by the replicated pieces of the ith structural data, generate a first sequence of numbers obtained by inserting a value identifying the input port or the output port indicated by the ith structural data, in the ith digit of (n−1)-digit sequence generated from a second sequence of numbers from the first to nth numbers excluding the ith number,
    set identification information of the input port and of the output port indicated by the replicated pieces of the ith structural data, at the first sequence of numbers, and
    generate the connection information indicating connection relationship in which each of number j of output ports indicated by each of the replicated pieces of the jth structural data is coupled to a second input port having same identification information as the each output port, among number (j+1) of input ports indicated by the replicated (j+1)th structural data, where j is a natural number ranging from 1 to (n−1).

5. The apparatus of claim 4, wherein
the ith-type topological structure included in the network is an inverted topological structure of the (n−i+1)th-type topological structure, where n is an odd number whose value is 3 or greater, and i is a natural number ranging from 1 to ((n−1)/2); and
the ((n+1)/2)th-type topological structure includes a plurality of switches that couples the plurality of switches, and has a line symmetry with respect to a line that couples each of the plurality of switches.

6. The apparatus of claim 5, wherein
the memory is further configured to store connection information indicating connection relationship between topological structures in the network, and transfer patterns from the first number of transfer patterns indicating combinations of input ports and output ports for performing all-to-all communication without path conflict in the first-type topological structures, to the number n of transfer patterns indicating combinations of input ports and output ports for performing all-to-all communication without path conflict in the nth-type topological structures, and
the processor is configured to:
    upon designation of a combination from a first transfer pattern of the first number of transfer patterns to a nth transfer pattern of the nth number of transfer patterns, identify a first plurality of paths from the plurality of transmission sources to the plurality of transmission destinations in the network indicated by the connection information, in association with the combination from the first transfer pattern to the nth transfer pattern, and
    further identify a second plurality of paths from the plurality of transmission sources to the plurality of transmission destinations in a case where communication from each of the plurality of transmission sources is turned around at the plurality of switches included in the ((n+1)/2)th-type topological structure.

7. The apparatus of claim 1, wherein the processor is further configured to:
  transmit, to each of the plurality of transmission sources, transfer patterns with which to perform all-to-all communication without path conflict from the plurality of transmission sources to the plurality of destinations in the network, and
  transmit information indicating output ports of each of the topological structures, corresponding to the identified plurality of paths in the network, to switches included in the each topological structure.

8. A method comprising:
  providing connection information indicating connection relationship between topological structures in a network, in which each of a first-type topological structures is coupled to each of second-type topological structures, each of the first-type topological structures including the first output ports and first input ports to which a plurality of transmission sources are coupled, respectively, and each of the second-type topological structures including second input ports and second output ports to which a plurality of destinations are coupled, respectively;
  providing first transfer patterns each indicating a combination of the first input ports and the first output ports for performing all-to-all communication without path conflict in each of the first-type topological structures, and second transfer patterns each indicating a combination of the second input ports and the second output ports for performing all-to-all communication without path conflict in each of the first number of second-type topological structures;
  determining, based on the connection information, a first number of the second-type topological structures and a second number of the first-type topological structures, where a third number of the first input ports and a fourth number of the first output ports both equal the first number, and a fifth number of the second input ports and a sixth number of the second output ports both equal the second number;
  identifying a plurality of paths from the plurality of transmission sources to the plurality of transmission destinations in the network indicated by the connection information, in association with a combination of a first transfer pattern among the first transfer patterns and a second transfer pattern among the second transfer patterns; and
  based on the identified plurality of paths, determining a third transfer pattern with which to perform all-to-all communication without path conflict from the plurality of transmission sources to the plurality of transmission destinations in the network, and determining output ports of each of the second number of first-type topological structures and of each of the first number of second-type topological structures in the network, corresponding to the identified plurality of paths in the network.

9. A non-transitory, computer-readable recording medium having stored therein a program for causing a computer to execute a process comprising:
  providing connection information indicating connection relationship between topological structures in a network, in which each of first-type topological structures is coupled to each of second-type topological structures, each of the first-type topological structures includes first output ports and first input ports to which a plurality of transmission sources are coupled, respectively, and each of the second-type topological structures includes second input ports and second output ports to which a plurality of destinations are coupled, respectively;
  providing first transfer patterns each indicating a combination of the first input ports and the first output ports for performing all-to-all communication without path conflict in each of the first-type topological structures, and second transfer patterns each indicating a combination of the second input ports and the second output ports for performing all-to-all communication without path conflict in each of the second-type topological structures;
  determining, based on the connection information, a first number of the second-type topological structures and a second number of the first-type topological structures, where a third number of the first input ports and a fourth number of the first output ports both equal the first number, and a fifth number of the second input ports and a sixth number of the second output ports both equal the second number;
  identifying a plurality of paths from the plurality of transmission sources to the plurality of transmission destinations in the network indicated by the connection information, in association with a combination of a first transfer pattern among the first transfer patterns and a second transfer pattern among the second transfer patterns; and
  based on the identified plurality of paths, determining a third transfer pattern with which to perform all-to-all communication without path conflict from the plurality of transmission sources to the plurality of transmission destinations in the network, and determining output ports of each of the second number of first-type topological structures and of each of the first number of second-type topological structures in the network, corresponding to the identified plurality of paths in the network.

* * * * *